US012585214B2

(12) United States Patent
Furuichi et al.

(10) Patent No.: US 12,585,214 B2
(45) Date of Patent: Mar. 24, 2026

(54) HEATING DEVICE, FIXING DEVICE, DRIER, LAMINATE PROCESSING APPARATUS, AND IMAGE FORMING APPARATUS

(71) Applicants: Yuusuke Furuichi, Kanagawa (JP); Hitoshi Fujiwara, Kanagawa (JP)

(72) Inventors: Yuusuke Furuichi, Kanagawa (JP); Hitoshi Fujiwara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/782,036

(22) Filed: Jul. 24, 2024

(65) Prior Publication Data

US 2025/0036048 A1 Jan. 30, 2025

(30) Foreign Application Priority Data

Jul. 27, 2023 (JP) ................................. 2023-122402

(51) Int. Cl.
*G03G 15/20* (2006.01)

(52) U.S. Cl.
CPC ..... *G03G 15/2017* (2013.01); *G03G 15/2039* (2013.01); *G03G 15/2064* (2013.01)

(58) Field of Classification Search
CPC ........... G03G 15/2017; G03G 15/2039; G03G 15/2064
See application file for complete search history.

(56) References Cited

U.S. PATENT DOCUMENTS

| | | | | |
|---|---|---|---|---|
| 5,726,425 | A * | 3/1998 | Moebius | G03G 15/2053 219/471 |
| 5,821,499 | A * | 10/1998 | Crimmins | G03G 15/2053 219/471 |
| 2001/0025840 | A1* | 10/2001 | Yokoyama | H05B 6/145 399/331 |
| 2003/0044204 | A1* | 3/2003 | Lee | H05B 3/0095 399/330 |
| 2006/0000825 | A1* | 1/2006 | Sekiguchi | H05B 6/145 219/619 |
| 2011/0236037 | A1* | 9/2011 | Ogawahara | G03G 15/2064 399/328 |
| 2015/0071688 | A1* | 3/2015 | Yamaguchi | G03G 15/2053 399/329 |
| 2016/0334741 | A1* | 11/2016 | Takahashi | G03G 15/2053 |
| 2024/0319641 | A1* | 9/2024 | Andoh | G03G 15/2053 |

FOREIGN PATENT DOCUMENTS

| | | | |
|---|---|---|---|
| EP | 3709094 A1 * | 9/2020 | G03G 15/2053 |

* cited by examiner

*Primary Examiner* — Sevan A Aydin
(74) *Attorney, Agent, or Firm* — XSENSUS LLP

(57) ABSTRACT

A heating device including a heater; a flange including a beam, wherein the flange rotatably supports an endless belt; a temperature detector to detect a temperature, the temperature detector disposed inside the endless belt; a lead wire connected to the temperature detector, the lead wire extending from an inside of the endless belt to an outside of the endless belt through an inside of the flange, wherein the inside of the flange is a side surrounded by the beam and the other surface of the flange; a heater holder to hold the heater; and a gap separates the flange from one of the heater, the heater holder, and a stay, when all of the heater, the heater holder, and the stay were pressed toward one side of the flange, and the gap is smaller than a diameter of the lead wire.

20 Claims, 24 Drawing Sheets

HEATING DEVICE, FIXING DEVICE, DRIER, LAMINATE PROCESSING APPARATUS, AND IMAGE FORMING APPARATUS

CROSS-REFERENCE TO RELATED APPLICATIONS

This patent application is based on and claims priority pursuant to 35 U.S.C. § 119(a) to Japanese Patent Application No. 2023-122402, filed on Jul. 27, 2023, in the Japan Patent Office, the entire disclosure of which is hereby incorporated by reference herein.

BACKGROUND

Technical Field

The present disclosure generally relates to a heating device, a fixing device, drying devise, and an image forming apparatus.

Related Art

One type of image forming apparatus such as a copier or a printer includes a fixing device that uses a planar heater, having a plate shape and including resistive heat generators, to heat a fixing belt.

Such a fixing device could include a thermostat to cuts off a current flowing through the resistive heat generators under a certain condition and a thermistor to detect a temperature of the fixing belt, the temperature detected by the thermistor is used for the image forming apparatus to control the heater to achieving a given fixing temperature. Such thermostat and thermistor are connected to electronics of the image forming apparatus via the conductive wire. Such a fixing device could also include a pair of belt holders holding both ends of the fixing belt in a rotational axis direction of the fixing belt.

With using some types of the belt holder, damaging to the conductive wire sometimes occurred while assembling the fixing device. So the fixing device which could achieve improvement to address the circumstance was desired.

SUMMARY

In accordance with the present disclosure, a heating device comprises an endless belt; a heater including a base and a heat generator; a flange including a beam, wherein the flange is disposed at an end of the endless belt, and the flange rotatably supports the endless belt; a temperature detector to detect a temperature, the temperature detector disposed inside the endless belt; a lead wire connected to the temperature detector, wherein the lead wire extends from an inside of the endless belt to an outside of the endless belt through an inside of the flange, and the inside of the flange is surrounded by the beam and the other surface of the flange; a heater holder to hold the heater; and a stay to support the heater holder, wherein the stay extends to the inside of the flange and to the outside of the endless belt, wherein a gap separates the flange from one of the heater, the heater holder, and the stay, when all of the heater, the heater holder, and the stay are pressed toward one side of the flange, and the gap is smaller than a diameter of the lead wire.

BRIEF DESCRIPTION OF THE DRAWINGS

A more complete appreciation of the present disclosure and many of the attendant advantages and features thereof can be readily obtained and understood from the following detailed description with reference to the accompanying drawings, wherein:

FIG. 23C-1 is cross-sectional view the beam including a rib;

FIG. 23C-2 is cross-sectional view the beam including a rib;

FIG. 23C-3 is cross-sectional view the beam including a rib;

FIG. 23C-4 is cross-sectional view the beam including a plurality of ribs;

FIG. 23C-5 is cross-sectional view the beam including a plurality of ribs;

Figure 1:
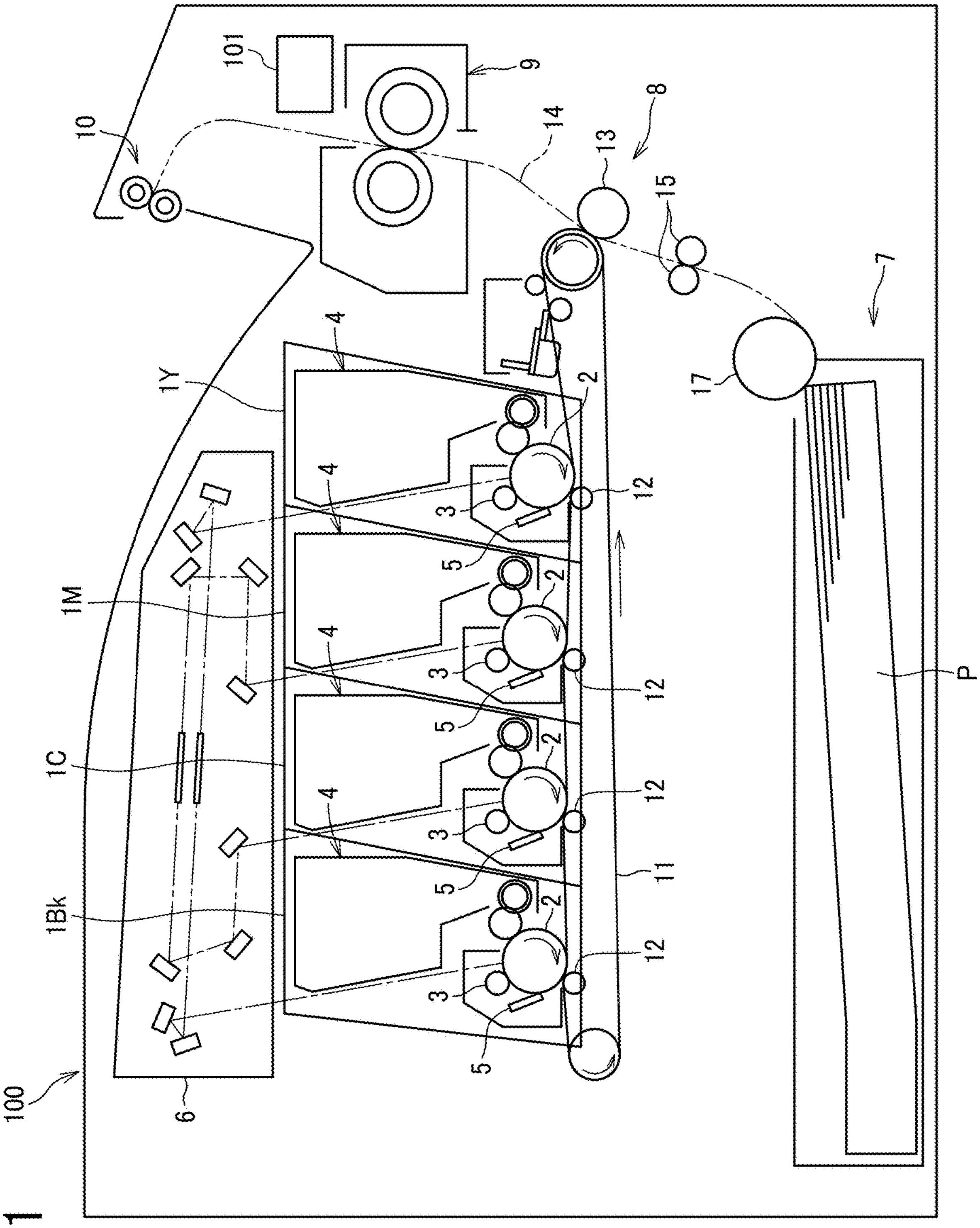
FIG. 1 is a schematic diagram of a configuration of an image forming apparatus.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a," "an," and "the" are intended to include the plural forms as well, unless the context clearly indicates otherwise.

With reference to the accompanying drawings, descriptions are given below of the present disclosure. In the drawings of the present disclosure, like reference signs denote like elements, and overlapping description may be simplified or omitted as appropriate.

FIG. 1 is a schematic diagram of a configuration of an image forming apparatus.

In the following description, the "image forming apparatus" includes a printer, a copier, a facsimile machine, or a multifunction peripheral having at least two of printing, copying, scanning, and facsimile functions. "Image formation" means the formation of images with meanings such as characters and figures and the formation of images with no meanings such as patterns.

As illustrated in FIG. 1, the image forming apparatus 100 includes four process units 1Y, 1M, 1C, and 1Bk as image forming units. The process units 1Y, 1M, 1C, and 1Bk have a same configuration except for containing different color toners (developers), i.e., yellow (Y), magenta (M), cyan (C), and black (Bk) toners. Specifically, each of the process units 1Y, 1M, 1C, and 1Bk includes a photoconductor 2 serving as an image bearer bearing the image on a surface of the image bearer, a charger 3 to charge the surface of the photoconductor 2, a developing device 4 to supply the toner as the developer to the surface of the photoconductor 2 to form a toner image, and a cleaner 5 to clean the surface of the photoconductor 2.

The image forming apparatus 100 further includes: an exposure device 6 to form an electrostatic latent image on a photoconductor 2 in each of the process units 1Y, 1M, 1C, and 1Bk; a recording medium feeder 7 to feed a sheet P as a recording medium; a transfer device 8 to transfer an image, formed on the photoconductor 2, onto the sheet P; a fixing device 9 (also referred to as "heating device 9") to fix the image, transferred from the transfer device 8, onto the sheet P; and a recording medium ejector 10 to eject the sheet P to an outside of the image forming apparatus 100.

Although a "recording medium" is described as a "sheet of paper" (referred to simply as "sheet") in the following description, the "recording medium" is not limited to the sheet of paper. Examples of the "recording medium" include not only a sheet of paper but also an overhead projector (OHP) transparency sheet, a fabric, a metallic sheet, a plastic film, and a prepreg sheet including carbon fibers previously impregnated with resin. Examples of the "sheet" include thick paper, a postcard, an envelope, thin paper, coated paper (e.g., coat paper and art paper), and tracing paper, in addition to plain paper.

The transfer device 8 includes: an endless belt 11, stretched by a plurality of rollers, as an intermediate transfer belt; four primary transfer rollers 12 disposed inside the loop of the endless belt 11 to transfer the image from each of the photoconductor 2 to the endless belt 11; and a secondary transfer roller 13 to transfer the image from the endless belt 11 to the paper P. Each of the primary transfer rollers 12 is in contact with the corresponding photoconductor 2 via the endless belt 11 to form a primary transfer nip between the endless belt 11 and each photoconductor 2. The secondary transfer roller 13 is in contact with one of the plurality of rollers via the endless belt 11 to form a secondary transfer nip.

The image forming apparatus 100 further includes a conveyance path 14 to convey the sheet P fed from the recording medium feeder 7 including feeding roller 17. In the conveyance path between the recording medium feeder 7 and the secondary transfer nip (secondary transfer roller 13), a timing roller pair 15 is provided.

Referring to the FIG. 1, the printing operation of the image forming apparatus 100 is described below.

When the image forming apparatus 100 starts the printing operation, the photoconductors 2 in the process units 1Y, 1M, 1C, and 1Bk rotates clockwise in FIG. 1 and the charger 3 uniformly charges the surface of the photoconductor 2 to a high electric potential. Based on image data of a document read by a document reading device or print data instructed to print by a terminal, the exposure device 6 exposes the charged surface of each of the photoconductors. As a result, the electric potential at an exposed portion on the surface of each of the photoconductors 2 is decreased. Thus, an electrostatic latent image is formed on the surface of each of the photoconductors 2. The developing device 4 supplies toner to the electrostatic latent image formed on the photoconductor 2 to form the toner image on the photoconductor 2.

The toner images formed on the photoconductors 2 reach the primary transfer nips defined by the primary transfer rollers 12 with the rotation of the photoconductors 2 and are transferred onto the intermediate transfer belt 11 rotated counterclockwise in FIG. 1 successively such that the toner images are superimposed on the endless belt 11. The toner image transferred onto the endless belt 11 is conveyed to the secondary transfer nip (the position of the secondary transfer roller 13) and is transferred onto the sheet P conveyed by the conveyance path from the recording medium feeder 7. The sheet P fed from the sheet tray 16 is brought into contact with the timing roller pair 15 and temporarily stopped before the sheet P inters to the secondary transfer nip so that the sheet P coincides with the image to be transferred to the sheet P at the secondary transfer nip. In this way, the full-color image is transferred to the sheet P. After the toner image is transferred to the endless belt 11, the cleaner 5 removes the residual toner that remains on the photoconductor 2.

The sheet P bearing the toner image is conveyed to the fixing device 9 to fix the toner image onto the sheet P. Then, the recording medium ejector 10 outputs the sheet P. Thus, a series of printing operations is completed.

Fixing Device

Figure 2:
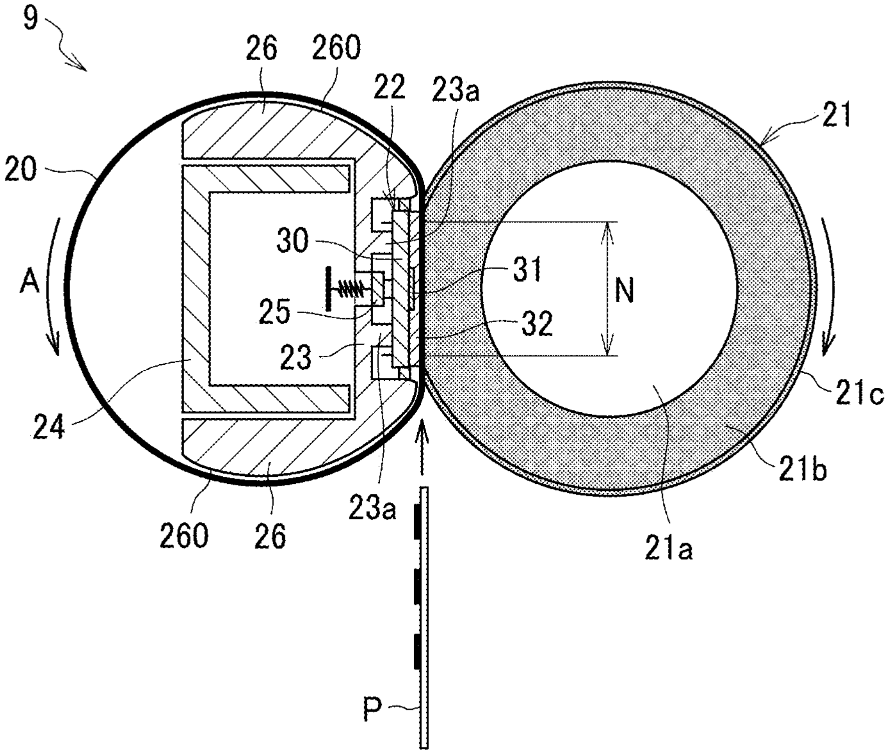
FIG. 2 is a cross-sectional view of a center portion of a fixing device.

As illustrated in FIG. 2, the fixing device (heating device) 9 includes: a fixing belt 20, which is an endless belt; a pressure roller 21 which contacts the outer surface of the fixing belt 20 as an opposing member to form a fixing nip N; a heater 22 to heat the fixing belt 20 as a heating member; a heater holder 23 which holds the heater as a holding member; a stay 24 which supports the heater holder 23 as a supporting member; and a thermistor 25, which detects a temperature of the fixing belt 20 or the heater 22, as a temperature sensor With respect to fixing device 9, a "longitudinal direction" of the heater 22 means a direction along to a surface of a base of the heater 22 on which the heat generators 31 is provided and described as X. The "longitudinal direction" of the heater 22 is also described as a direction parallel with a rotation axis of a rotator such as fixing belt 20 etc. or, a direction of arrangement of the heat generators 31 (arrangement direction). A "short direction" of the heater 22, sometimes called as width direction of the heater 22, is a direction orthogonal to said "longitudinal direction" of the heater 22 and described as Y. A "thickness (height) direction" of the heater 22 is a direction orthogonal to said "longitudinal direction" of the heater 22 and orthogonal to said "short direction" of the heater 22 and described as Z.

The fixing belt 20, for example, includes a tubular shaped base, which has a loop diameter around 25 mm and a thickness of 40 μm to 120 μm and consist of metal such as polyimide (PI). The release layer, a thickness of 5 μm to 50 μm, is provided on the most outer surface of the fixing belt 20 to increase the releasability and the durability. The release layer is made of, for example, fluorocarbon resin such as tetrafluoroethylene-perfluoroalkylvinylether copolymer (PFA), polytetrafluoroethylene (PTFE). Also, it is possible to have an elastic layer between the base and the release layer. The material for the base of the endless belt is not limited to polyimide, it could also be a heat resistant resin such as polyetheretherketon (PEEK) or a metal such as nickel (Ni) or stainless steel (SUS). The polyimide or PTFE could be applied on the inner circumferential surface of the endless belt as a sliding layer.

The pressure roller 21, for example, includes a solid iron center axis 21*a*, an elastic layer 21*b* provided around the axis 21*a* and a release layer 21*c* provided on an outer surface of the elastic layer 21*b*, and has an outer diameter of 25 mm. For example, the elastic layer 21*b* is made of silicone rubber and has a thickness of 3.5 mm. It is preferable to have the release layer 21*c* on the outer surface of the elastic layer 21*b*, for example, made of a fluororesin with a thickness of 40 μm, to increase the releasability.

The pressure roller 21 is pressed toward the fixing belt 20, by a biasing member 21*f*, such that the pressure roller 21 indirectly pressures and contacts the heater 22 through the fixing belt 20. In this way, the fixing nip N is formed between the fixing belt 20 and the pressure roller 21. The pressure roller 21 is configured to be rotated by a driver 101 and the pressure roller 21 rotates in a direction shown in FIG. 2, and this rotation of the pressure roller 21 rotates the fixing belt 20 in a direction A.

The heater 22 extends in the longitudinal direction parallel to a width direction of the fixing belt 20. The heater 22 includes a base 30, a heat generator (heat generators, resistive heat generators, resistance heating elements) 31 provided on the base 30, an insulation layer 32 provided to cover the heat generator 31.

One side of the heater 22 with the insulation layer 32 provided contacts to the inner circumferential surface of the fixing belt 21. Power is supplied to the heater 22, and the resistive heat generators 31 generate heat. The heat is transferred to the fixing belt 21 to heat the fixing belt 21 through the insulation layer 32. Although the heat generators 31 and the insulation layer 32 are disposed on the front side of the base 30, which is the side facing the fixing belt 20 (the side which forms the nip N), alternatively, the heat generator 31 may be disposed on the back side of the base 30, which is the side facing the heater holder 23. In that case, since the heat caused by the heat generators 31 is transmitted to the fixing belt 20 through the base 30, it is preferable that the base 30 be made of a material with high thermal conductivity such as aluminum nitride. Making the base 30 with a material having such high thermal conductivity enables to sufficiently heat the fixing belt 20 even if the heat generator 31 is disposed on the back side of the base 30. Even when the base 30 is made of aluminum nitride, coating the materials of the layers other than the base layer 30 enables integrally forming the layers. The heater 22 has a variety of variations as described below and it is possible to apply those variations into the device as well.

The heater holder 23 and the stay 24 are disposed inside the inner circumferential surface of the fixing belt 20. The stay 24 is configured by a channeled metallic member, and both side plates of the fixing device 9 support respective end portions of the stay 24. Supporting the heater holder 23 and the heater 22 held by the heater holder 23 by the stay 24 causes the heater 22 to be subjected to a pressing force of the pressure roller 21 while the pressure roller 21 presses the fixing belt 20 and forms the nip N stably.

The heater holder 23 is preferably made of heat-resistant material because heat from the heater 22 causes the heater holder 23 get hot. The heater holder 23 made of heat-resistant resin having low thermal conduction, such as a liquid crystal polymer (LCP), reduces heat transfer from the heater 22 to the heater holder 23 and provides efficient heating of the fixing belt 20. In addition, the protrusion 23*a* is provided on the heater holder 23, and the protrusion 23*a* of the heater holder 23 contacts to the heater via the protrusion 23*a*, in such way, the heater holder 23 and the heater contacts each other in a small area, which reduces the heat transmission from the heater 22 to the heater holder 23. Furthermore, by arranging the protrusion 23*a* of the heater 22 so as to contact backside of the area of the heater 22 where the heat generators 31 are not provided. In other words, by avoid contacting the area where the temperature increase most likely occurs, the heat transmission from the heater 22 to the heater holder 23 reduces, and which results in even more efficient heating of the fixing belt 20.

Figure 3:
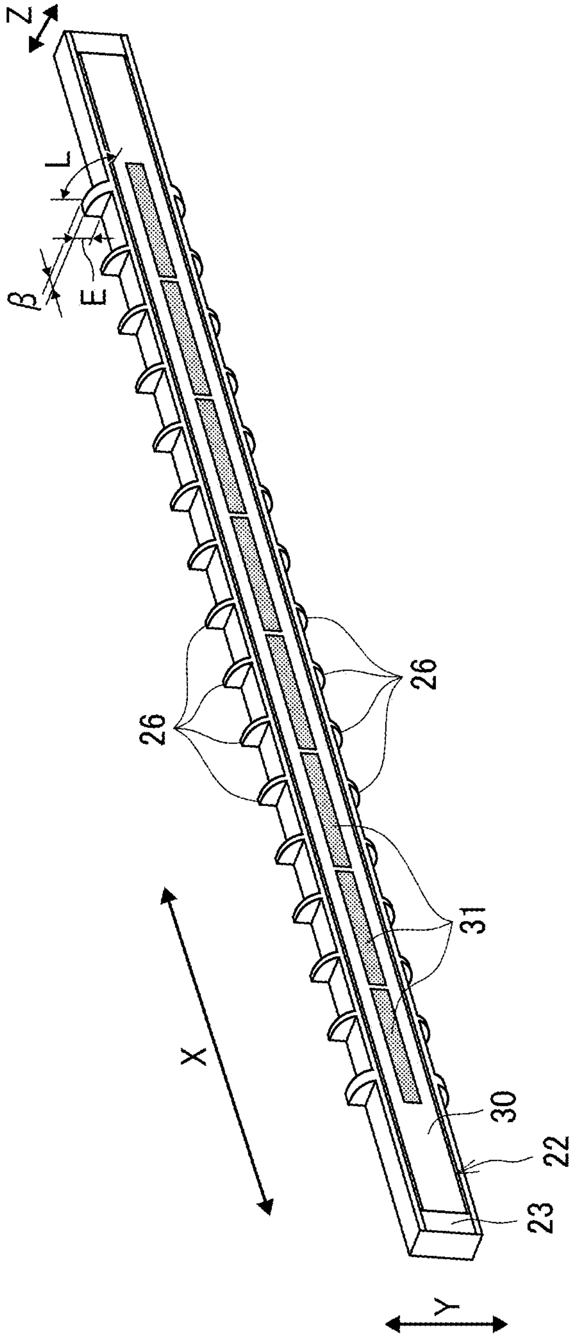
FIG. 3 is a perspective view of a heater, a heater holder and a guide.

Further, a guide portion 26 for guiding the fixing belt 20 is provided on the heater holder 23. The guide portion 26 is provided on the upstream side of the heater 22 (the lower side of the heater 22 in FIG. 2) and the downstream side (the upper side of the heater 22 in FIG. 2) in the belt rotation direction respectively. Further, as shown in FIG. 3, a plurality of guide portions 26 on the upstream side and the downstream side is arranged with intervals over the longitudinal direction of the heater 22 (belt width direction). Each of the guide portions 26 is formed in a substantially sector shaped. Each guide portion 26 has an arc-shaped or convex curved surface as a belt facing surface 260, and extend along the belt circumferential direction so as to face the inner peripheral surface of the fixing belt 20 (see FIG. 2). Further, as shown in FIG. 3, the width B of each guide portion 26, the length of the belt circumferential direction (circumferential length) L, the height E are formed to be the same in each of the guide portions 26, except for the width β of the guide portions 26 disposed at both longitudinal ends of the heater 22. The width β of the guide portions 26 disposed at both longitudinal ends of the heater 22 is formed larger than other guide portions 26.

In the fixing device 9, when a printing operation is started, the pressing roller 21 is driven to rotate, and the fixing belt 20 starts to rotate according to the rotation of the pressing roller 21. Since an inner peripheral surface of the fixing belt 20 is guided in contact with the belt facing surface 260 of the guide portion 26, the fixing belt 20 rotates stably and smoothly. In addition, power is supplied to the heat generators 31 of the heater 22 to heat the fixing belt 20. After the temperature of the fixing belt 20 reaches to a predetermined target temperature (fixing temperature), the paper P with unfixed toner image is conveyed and passes between the fixing belt 20 and the pressing roller 21 (fixing nip N) as shown in FIG. 2, so that the unfixed toner image is heated and pressed to be fixed on the paper P.

Figure 4:
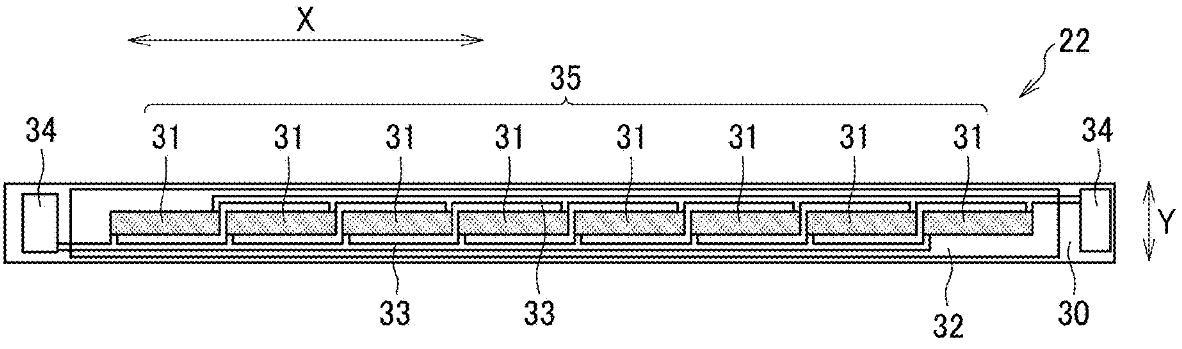
FIG. 4 is a plan view of a first heater.

FIG. 4 is a plan view illustrating heater 22.

As shown in FIG. 4, the heater 22 has a plurality of heat generators 31 arranged with intervals (gap) in its longitudinal direction (belt width direction). In other words, the heating portion 35 comprises the plurality of heat generators 31, which is separated by the intervals (gap) in the belt width direction. Each heat generators 31 is electrically connected, in parallel via a conductor 33, to a pair of electrode 34 provided on both longitudinal ends of the base 30. The conductor 33 is made of a material having a smaller resistance value than the heat generators 31. The gap between the heat generators 31 adjacent to each other is preferably 0.2 mm or more, preferably 0.4 mm or more, from the viewpoint of ensuring insulation between the heat generators 31. Further, if the gap between the heat generators 31 adjacent to each other is too large, then the temperature drops at the gap. In this reason, from the viewpoint of reducing the temperature unevenness in the longitudinal direction, the gap is preferably to be 5 mm or less, more preferably to be 1 mm or less.

Since the heat generators 31 include a material having a PTC (positive temperature resistance coefficient) characteristic, the resistance value of the heat generators 31 increases when the temperature increases (heater output decreases).

Due to this characteristic, for example, in a case when a sheet with a sheet width, that is smaller than the entire width of the heating portion 35, passes the fixing nip N, the heat of the fixing belt 20 would not be taken away by the sheet in a region outside the sheet width, and therefore the temperature of the heat generators 31 corresponding to the region outside the sheet width increases. Since the voltage applied to the heat generators 31 is constant, when the temperature of the heat generators 31 outside the paper width rises, then the resistance value of the heat generators 31 outside the paper width rises due to the characteristic and the output (heating value) outside the paper width decreases relatively. Thus, the temperature rise outside the paper width is suppressed. Further, since the plurality of heat generators 31 are electrically connected in parallel, it is possible to suppress the temperature rise of the non-sheet passing area while maintaining the printing speed. Note that the heat generators 31 constituting the heating portion 35 may be other material which does not have the PTC characteristic. The heating element may be arranged in a plurality of rows in the direction perpendicular to the longitudinal direction of the heater 22.

The heat generators 31 are formed, for example, by coating a paste blended with silver-palladium (AgPd), glass powder, or the like, on the base 30 by using screen printing or the like, and bake the base 30 afterward. In an implementation, the resistance value of the heat generators 31 is set to 80Ω at room temperature. A resistance material of silver-alloy (AgPt) or ruthenium-oxide (RuO2) may be used as the material of the heat generators 31 in addition to those described above. The conductor 33 or the electrode could be formed with a silver (Ag) or silver-palladium (AgPd) by screen-printing or the like.

The material of the base 30 is preferably a ceramic such as alumina or aluminum nitride, which is excellent in heat resistance and insulating performance, or a non-metallic material such as glass or mica. In an implementation, an alumina base material having a short length of 8 mm, a longitudinal length of 270 mm, and a thickness of 1.0 mm is used. Alternatively, those obtained by laminating an insulating material to a conductive material such as metal could also be used as a base 30. As the metal material, aluminum, stainless steel, or the like is preferable since they are low-cost materials. Further, in order to improve the soaking performance of the heater 22 and to enhance the image quality, the base 30 may use a material having a high thermal conductivity such as copper, graphite, or graphene.

An insulating layer 32 is made of, for example, heat-resistant glass having a thickness of 75 μm. The insulating layer 32 covers the heat generators 31 and the conductor 33, so as to insulates and protects them. The insulating layer 32 also maintains the sliding performance with the fixing belt 20.

Figure 5:
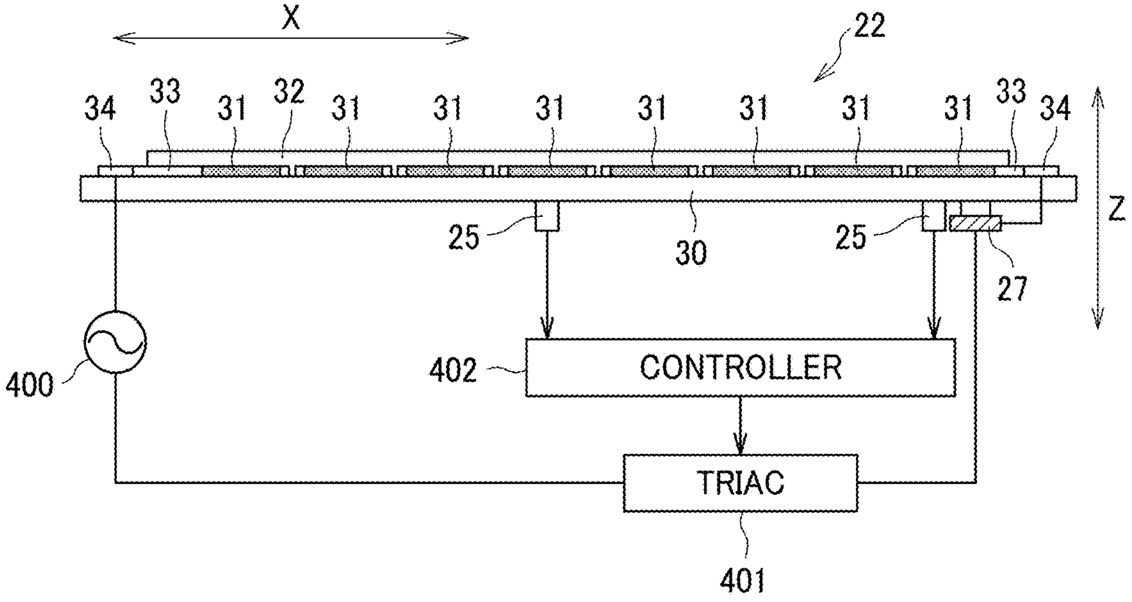
FIG. 5 a schematic diagram illustrating a heating device, an electrical power control circuit, and a controller.

FIG. 5 is a diagram showing a power supply circuit to the heater 22.

As shown in FIG. 5, the power supply circuit for supplying power to each heat generators 31 is configured by electrically connecting the electrode portion 34 of the AC power source 400 and the heater 22. Further, the triac 401 for controlling the amount of supplied power is provided in the power supply circuit. The control unit 402 based on the detected temperature of the thermistor 25 as a temperature detecting means controls the amount of power supplied to each heat generators 31 via the triac 401.

In an implementation, the control unit 402 includes a microcomputer including a CPU, a ROM, a RAM, an I/O interface, or the like. Further, the control unit 402 disclosed herein may be implemented using circuitry or processing circuitry which includes general purpose processors, special purpose processors, integrated circuits, ASICs ("Application Specific Integrated Circuits"), FPGAs ("Field-Programmable Gate Arrays"), other circuitry and/or combinations thereof which are programmed, using one or more programs stored in one or more memories, or otherwise configured to perform the disclosed functionality. Processors and controllers are considered processing circuitry or circuitry as they include transistors and other circuitry therein. In the disclosure, the circuitry, units, or means are hardware that carry out or are programmed to perform the recited functionality. The hardware may be any hardware disclosed herein which is programmed or configured to carry out the recited functionality.

Additionally, implementations may include a memory that stores a computer program which includes computer instructions. These computer instructions provide the logic and routines that enable the hardware (e.g., processing circuitry or circuitry) to perform the method disclosed herein. This computer program can be implemented in known formats as a computer-readable storage medium, a computer program product, a memory device, a record medium and/or the memory of the FPGA or ASIC.

Returning to FIG. 5, the thermistor 25 as a temperature detecting means is arranged on the longitudinal central region of the heater 22 which is within the minimum threading width, and on one end region of the heater 22 in the longitudinal direction respectively. Furthermore, for in case when the temperature of the heat generators 31 becomes a predetermined temperature or higher, the thermostat 27 as a power cutoff means for cutting off the power supply to the heat generators 31 is arranged on the one end region of the heater 22 in the longitudinal direction. The thermistor 25 and the thermostat 27 contact the back surface of the base 30 (the side opposite to the side where the heat generators 31 is disposed) to detect the temperature of the heat generators 31.

Figure 6:
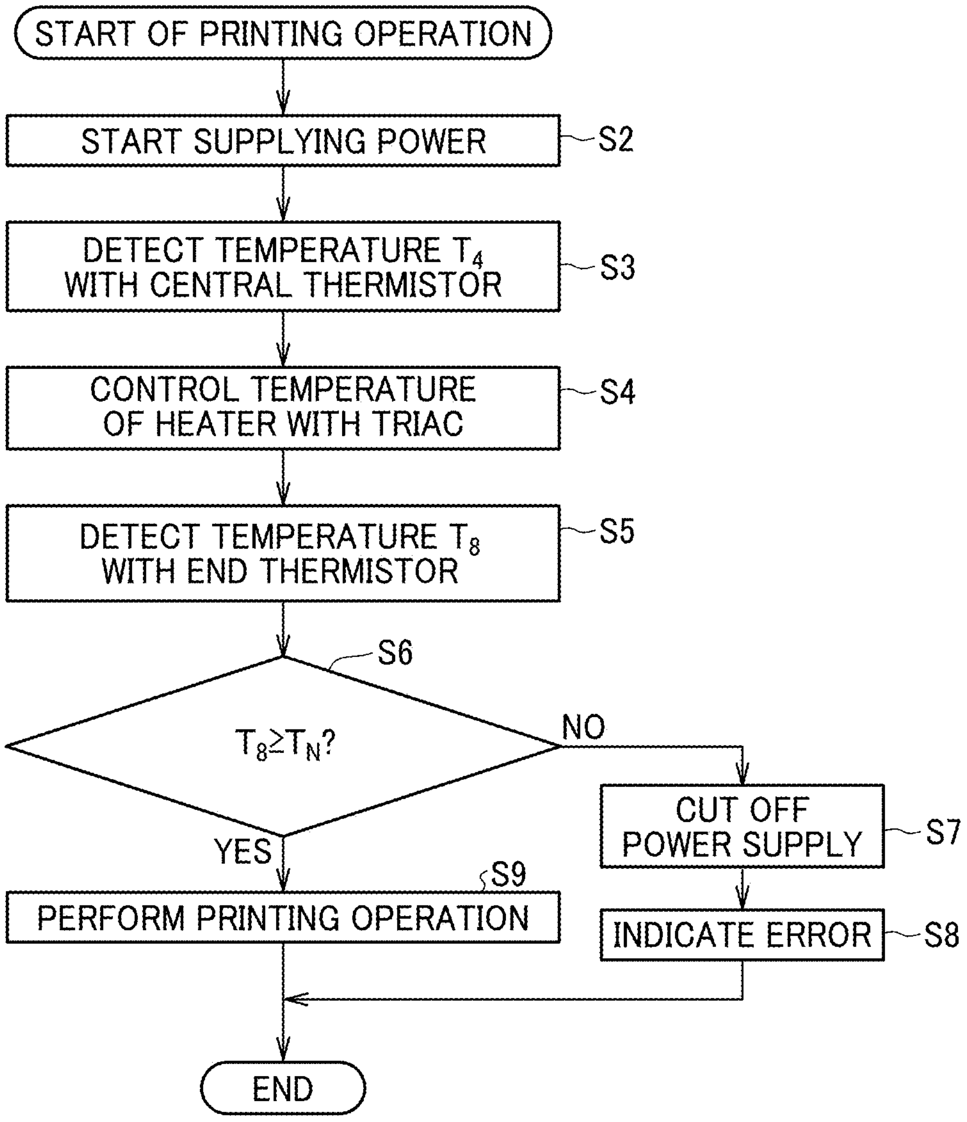
FIG. 6 is a flowchart illustrating a control operation of the heater.

FIG. 6 is a flowchart illustrating a control operation of heater 22.

First, when a printing operation is started in the image forming apparatus ("START OF PRINTING OPERATION" of FIG. 6), the control unit 402 starts to supply power from the AC power source 400 to each of the heat generators 31 of the heater 22 (S2 of FIG. 6). Thus, each of the heat generators 31 starts to generate heat, and the fixing belt 20 is heated. At this time, the temperature T4 of the heat generators 31 located in the central region of the heater 22 is detected by the thermistor (central thermistor) 25 disposed in the longitudinal central region of the heater 22 (S3 in FIG. 6). Then, the control unit 402 controls the amount of power supplied to each heat generator 31 via the triac 401, based on the temperature T4 obtained from the central thermistor 25, so that each heat generator 31 to be controlled at a predetermined temperature (S4 in FIG. 6).

At the same time, the temperature T8 of the heat generator 31 is also detected by the thermistor (end thermistor) 25 disposed on the one end region of the heater 22 in the longitudinal direction (S5 in FIG. 6). Then, the temperature T8, detected by the thermistor 25 at the end region, is determined whether if it is the predetermined temperature TN or more (T8≥TN) (S6 in FIG. 6), and if it is less than the predetermined temperature TN, the power supply to the heater 22 is cut off as abnormal low temperature occurrence (disconnection generation) (S7 in FIG. 6), and an error is displayed on the operation panel of the image forming apparatus (S8 in FIG. 6). On the other hand, if the detected temperature T8 is equal to or higher than the predetermined temperature TN, the printing operation is started as no abnormality low temperature occurrence (S9 in FIG. 6).

Further, if the heat generators 31 is damaged or if the temperature control based on the detection of the central thermistor 25 becomes unstable due to disconnection, the temperature of other heat generators 31 including the heat generator 31 of the one end region of the heater 22 in the longitudinal direction may become abnormally high. In that case, the power supply to the heat generators 31 shuts off by the activation of the thermostat 27 due to detecting a predetermined or higher temperature of the heat generators 31, which prohibits the heat generators 31 to become abnormally high temperature.

Meanwhile, when using the fixing belt 20 as in the fixing device 9, since the heat capacity of the fixing belt 20 is small, the surface temperature of the fixing belt 20 is easily affected by the heat generation amount distribution of the heater 22. Accordingly, when using the heating portion 35 with a gap, which separates the heating portion 35 into the heat generators 31 arranged in the belt width direction as in the fixing device 9, the temperature of the fixing belt 20 tends to be low at a point corresponding to the gap of the heating portion 35.

Subsequently, another implementation of heater 22 is described with reference to FIG. 7. Note that, in the following description, a portion different from heater 22 illustrated in FIG. 4 will be described, and a description thereof may be omitted as appropriate because the other portions have a same configuration. The heater 22 of FIG. 7 may be referred to herein as a series type for convenience.

Figure 7:
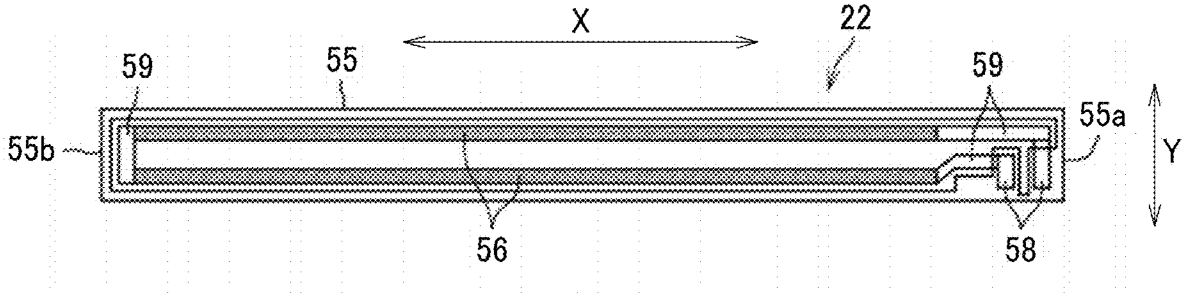
FIG. 7 is a plan view of second heater.

As shown in FIG. 7, the heater 22 has a plate-like base 55 extending in one direction (arrow X direction in FIG. 7). The base 55 is disposed such that its longitudinal direction X faces the longitudinal direction of the fixing belt 20 or the axial direction of the pressing roller 21. On one surface of the base 55, two heat generators 56 extend in the longitudinal direction X of the base 55 and are arranged side by side in the lateral direction Y of the base 55.

As shown in FIG. 7, a pair of electrodes 58 is provided on one side in the longitudinal direction X of the base 55. Each electrode 58 is connected to each heat generator 56 through a conductor 59. The other side, opposite to the one side, the heat generator 56 is connected to each other through another conductor 59. Each heat generator 56 and each conductor 59 is covered by an insulating layer 57 to ensure insulation. On the other hand, each of the electrodes 58 is exposed without being covered by the insulating layer 57 so that a connector as a power supply terminal, to be described later, can be connected.

The base 55 is made of a material having excellent heat resistance and insulating properties such as ceramic (e.g. alumina or aluminum nitride), glass, mica, or polyimide. The base 55 may be stainless steel (SUS), iron or a metal material such as aluminum (conductive material) on which an insulating layer is formed. In particular, when a high thermal conductivity material such as aluminum, copper, silver, graphite, or graphene is used as the material of the base 55, it may improve the heat soaking performance of the heater 22 and image quality would be enhanced. The insulating layer 57 is made of a material having excellent heat resistance and insulating performance such as ceramic (e.g. alumina or aluminum nitride), glass, mica, or polyimide.

The heat generators 56 can be formed, for example, by coating a paste blended with silver-palladium (AgPd), glass powder, or the like, on the base 55 by using screen printing or the like, and bake the base 55 afterward. A resistance material such as silver-alloy (AgPt) or ruthenium-oxide ($RuO2$) could also be used as the material of the heat generators 56. The electrodes 58 and the conductors (or may call it power supply line) 59 could be formed with a silver (Ag) or silver-palladium (AgPd) by screen-printing or the like.

Figure 8:
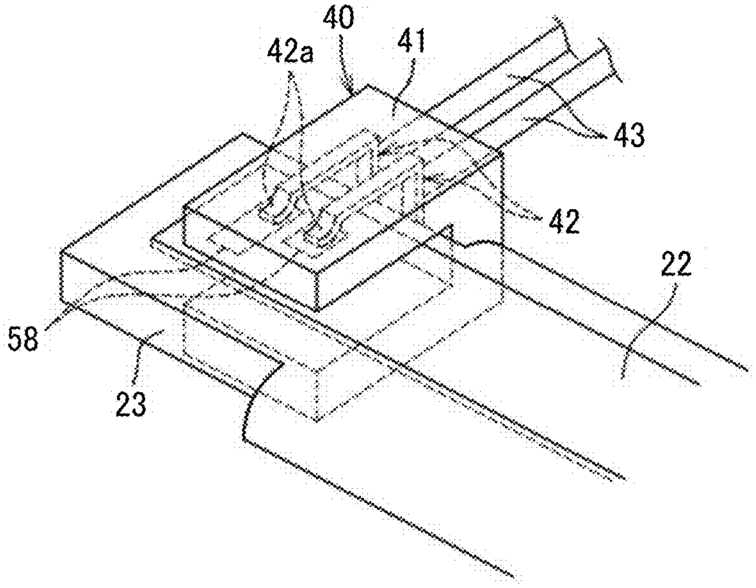
FIG. 8 is a partial perspective view illustrating a connector connected to the heater.

FIG. 8 is a perspective view showing a state in which the connector 40 as a power supply member to the heater 22 is connected to the heater 22.

As shown in FIG. 8, the connector 40 includes a housing 41 made of resin, a plurality of contact terminals 42 provided in the housing 41, and a power supply harness 43 connected to each of the contact terminals 42. Each contact terminal 42 is constituted by an elastically deformable member such as a leaf spring.

As shown in FIG. 8, the connector 40 is attached to the heater 22 in a way which sandwiches both the heater 22 and the heater holder 23. Thus, the heater 22 and heater holder 23 are held together by the connector 40. Further, in this state, since the tip (contact portion 42*a*) of each contact terminal 42 elastically contact (pressed) to the corresponding electrode 58 respectively, each contact terminal 42 of the connector 40 and the corresponding electrode 58 are electrically connected. Thus, power from the power source provided in the image forming apparatus can be supplied to the heater 22 (each resistance heating element 56) through the connector 40.

Figure 9:
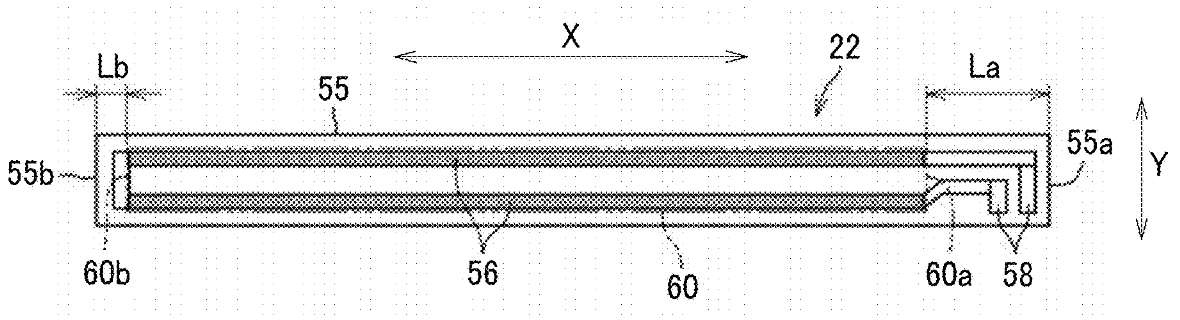
FIG. 9 is a plan view of a second heater.

Incidentally, in the heater 22 of FIGS. 7 and 8, as shown in FIG. 9, the electrodes 58 are provided only on one side in the longitudinal direction X of the base 55, and the electrode 58 is not provided on the other side. Therefore, it is necessary to secure a space for disposing the electrodes 58 on one side of the base 55, and if a space for disposing the electrodes 58 are secured, the base 55 becomes longer to the one side. That is, since the electrodes 58 are disposed only on one side of the base 55, the length La, which is between the end 60*a* of the heating region 60 at the electrode side in which each of the heat generator 56 is disposed, and the end 55*a* of the base 55 at the electrode side is longer than the length Lb, which is between the end 60*b* of the heating region 60 opposite to the electrode side (hereinafter, referred to as “counter-electrode side”) and the end 55*b* of the base 55 at the counter-electrode side. Here, the “heating region” means a region from the end to the end of all the heat generators 56 on the base material 55, not a region where one heat generator 56 is disposed. The same mean applies to the “heating region” in the following description.

Thus, in the configuration in which the base 55 of the heater 22 is formed longer to the one side in the longitudinal direction X, when the heater 22 is heated, the amount of heat transferred to the base 55 is increased at the one side (the length La side) than the other side (the length Lb side) of the base 55. That is, the amount of heat transferred to the end side where the electrodes 58 are provided increases compared to the other side. Therefore, in the electrode side, the temperature of the heater tends to be relatively low as compared with the opposite electrode side. In particular, since the temperature of the fixing device is lowered when the startup operation of the fixing device is first performed after the power of the image forming apparatus is turned on, the temperature of the heater at the electrode side is hard to increase. As a result, the temperature of the fixing belt varies in the longitudinal direction X, and the paper passing through the fixing nip may not be uniformly heated. Therefore, the following measures are taken in order to suppress the temperature variation of the fixing device.

Figure 10:
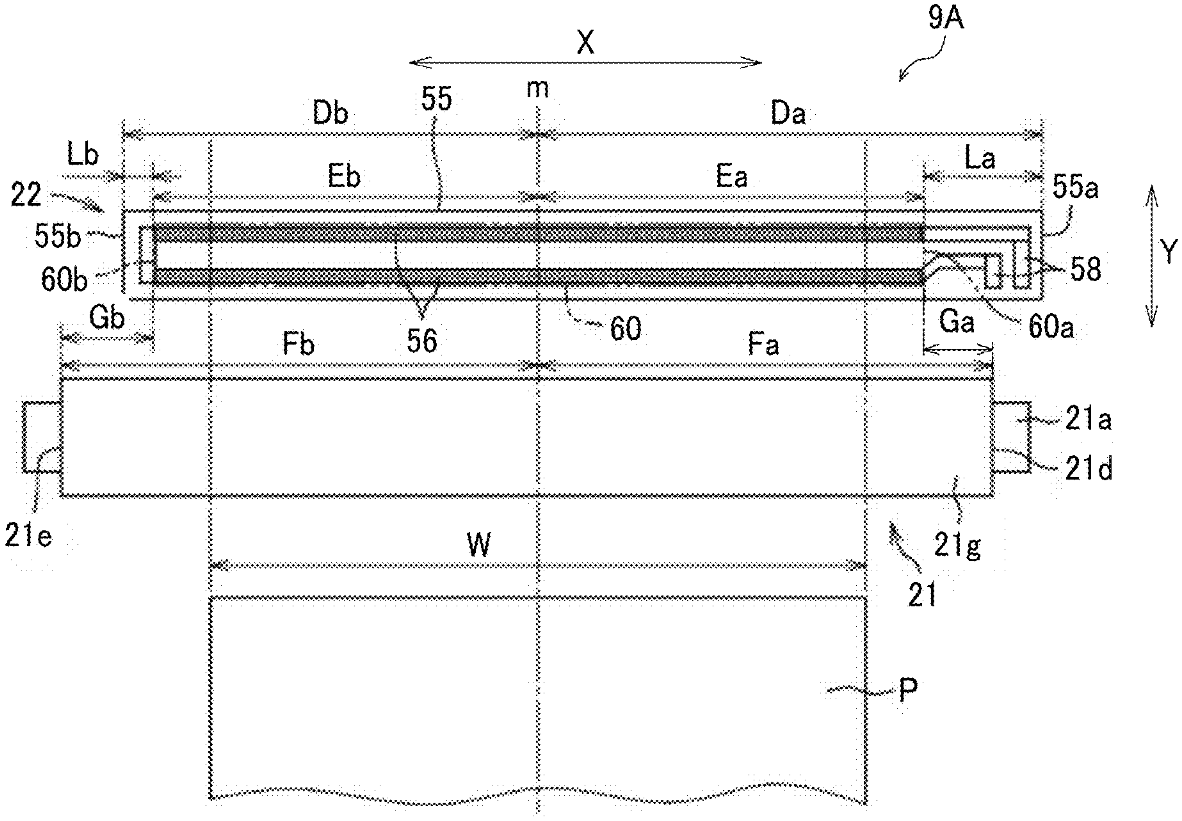
FIG. 10 is a schematic view of a heating device including the second heater.

FIG. 10 shows a fixing device including heater 22 of FIGS. 7-9. In FIG. 10, a heater 22 and a pressing roller 21 provided in the fixing device, and a maximum paper passing area (maximum sheet passing area) W in which a sheet P having the maximum width passes are shown, but a fixing belt and the like are omitted. For convenience, hereafter a fixing device 9A is used for the fixing device in which the heater is equipped.

As shown in FIG. 10, the heating region 60 of the heater 22 is arranged symmetrically with respect to the width direction center m of the maximum sheet threading area W, and the heating region 60 is larger than the maximum sheet threading area W, with intention that any size of paper would be uniformly heated over the width direction (a direction perpendicular to the sheet threading direction along the paper surface). That is, the length Ea from the center m in the width direction of the maximum sheet threading area W to the end 60*a*, at the electrode side of the heating region 60, and the length Eb from the center m in the width direction of the maximum sheet threading region W to the end 60*b*, at the opposite side to the electrode side of the heating region 60, are set to the same length (Ea=Eb). Incidentally, a central reference conveying system, in which papers of various width sizes are conveyed with reference to the respective widthwise centers, is employed. Therefore, the center m in the width direction of the maximum sheet threading region W is also the center in the width direction of the sheet threading region of the sheet with any size.

On the other hand, the base 55 of the heater 22 is arranged asymmetrically with respect to the width direction center m of the maximum threading region W, because it is formed long at the electrode side. That is, the length Da from the center m in the width direction of the maximum threading region W to the end 55*a* on the electrode side of the base 55 is set to be longer than the length Db from the center m in the width direction of the maximum threading region W to the end 55*b* on the opposite side to the electrode side (hereinafter, may called as opposite side) of the base 55 (Da>Db). Therefore, as described above, the amount of heat transferred from the heating region 60 to the electrode side of the base 55 is larger than the amount of heat transferred to the opposite side.

A part of heat generated in the heating region 60 moves to the base 55 and also to the pressing roller 21 through the fixing belt 20. For this reason, the amount of heat moving to the pressing roller 21 affects the temperature distribution of the heater 22 and the fixing belt 20. Therefore, if the amount of heat transferred to the pressing roller 21 to the electrode side and to the opposite side could be adjusted, the temperature distribution of the heater 22 and the fixing belt 20 could also be adjusted. Focusing on this point, the pressing roller 21 is shorter in the electrode side than in the opposite side.

In other words, as shown in FIG. 10, the length Fa from the center m of the width direction of the maximum threading region W to the end 21*d* of the electrode side of the pressing roller 21 is shorter than the length Fb from the center m of the width direction of the maximum sheet passing area W to the end 21*e* of the opposite side of the pressing roller 21 (Fa<Fb). In addition, the “end of the pressing roller” means the end of the roller portion 21*g* including an elastic layer or the like, not the end of the core bar 21*a* which is a shaft portion of the pressing roller 21 supported by a bearing or the like.

In FIG. 10, the pressing roller 21 (roller portion 21*g*) is formed to be shorter on the electrode side than the opposite side so that the length Ga, between the end 60*a* of the heating region 60 and the end 21*d* of the electrode side of the pressing roller 21, is shorter than the length Gb, between the end 60*b* of the heating region 60 and the end 21*e* of the opposite side of the pressing roller 21. Therefore, the amount of heat to move from the heater 22 to the pressure roller 21 is reduced in the electrode side compared to the opposite side, which reduces the temperature drop of the electrode side. That is, the amount of heat that moves to the electrode side of the base 55 is increased since the base 55 has the length which the heater 22 extends from the heating region 60 at the electrode side is longer than the length which the heater 22 extends from the heating region 60 at the opposite side (La>Lb). However, the length which the pressing roller 21 extends from the heating region 60 at the electrode side is shorter than the length which the pressing roller 21 extends from the heating region 60 at the opposite side, thereby achieving the balance (reducing the unbalance) of heat between the electrode side and the opposite side. Thus, the temperature dispersion in the fixing device is reduced, and the temperature drop in the electrode side and the excessive temperature rise in the opposite side is suppressed. Therefore, the fixing quality is improved.

In some implementations, differentiating the heating value at the one end of the heater and the other end of the heater in the longitudinal direction of the heater is not necessary for suppressing the temperature dispersion of the fixing device. Therefore, the disadvantage for differentiating the heating value (the temperature dispersion when the heat generators are in the maximum heat power, and the damage of the component due to the local thermal expansion) could be avoided. Therefore, the reliability as the fixing device is also improved.

Figure 11:
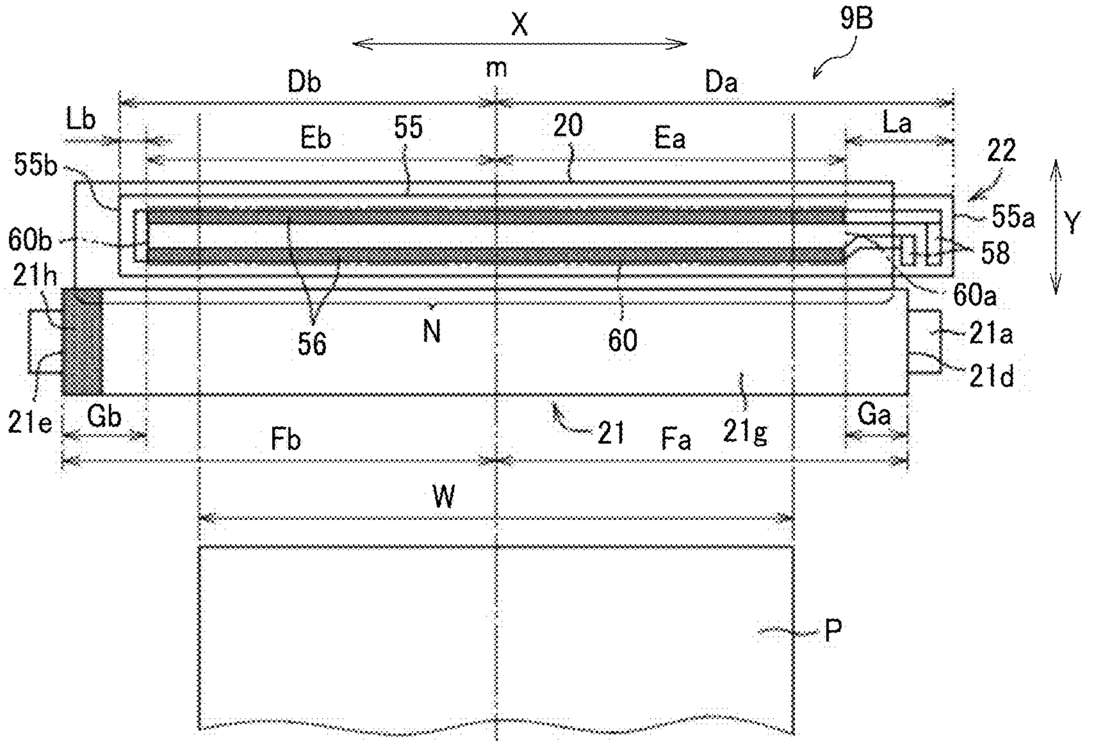
FIG. 11 is a schematic perspective view of another heating device including the second heater.

FIG. 11 is a diagram showing another fixing device equipped with a heater 22. For convenience, hereafter a fixing device 9B is used for another fixing device in which the heater 22 of FIGS. 7-9 is equipped.

In the configuration shown in FIG. 11, a high-friction portion 6321*h* is provided on the opposite electrode side of the pressing roller 21. Since the high friction portion 21*h* is provided on the opposite electrode side of the pressing roller 21, the frictional force between the fixing belt 20 and the pressing roller 21 at the opposite electrode side (the high friction portion 21*h* side) is higher than the electrode side. In other words, the frictional force between the fixing belt 20 and the pressing roller 21 of the opposite electrode side (the high friction portion 21*h* side) is greater than the electrode side. Except for that, the fixing device 9B and 9A have the same constructions. The frictional force (F) between the fixing belt and the pressing roller is obtained by the following equation (1) using the frictional coefficient (μ) between the fixing belt and the pressing roller and the contact pressure (N) of the pressing roller.

(Formula 1)

$$F=\mu\times N\ldots \quad (1)$$

In both fixing device 9B and fixing device 9A, the base 55 is longer to the electrode side (La>Lb), and the pressure roller 21 is shorter to the electrode side (Ga<Gb), so that heat is balanced between the electrode side and the opposite electrode side. However, when the pressure roller 21 is shortened to the electrode side, the contact area between the pressure roller 21 and the fixing belt 20 (the contact area in the longitudinal direction X) is reduced at the electrode side, so that the rotation transmission force between the pressure roller 21 and the fixing belt 20 is reduced at the electrode side. As a result, the fixing belt 20 may not be driven satisfactorily with respect to the rotation of the pressure roller 21, and the fixing belt 20 may cause slips when the paper passes through the fixing nip.

Therefore, the grip force between the fixing belt 20 and the pressure roller 21 is improved by providing the high friction portion 21*h* having a large frictional force against the fixing belt 20 on the opposite electrode side of the pressure roller 21. It is possible to compensate for the decrease in the rotation transmission force caused by the shortening of the pressing roller 21 to the fixing belt 20 at the electrode portion side, and which leads to the better transmission of rotation force to the fixing belt 20 from the pressure roller 21.

Specifically, the release layer 222 as a surface layer is not provided on a part of the outer peripheral surface of the elastic layer 221 of the pressure roller 21, and a part of the elastic layer 221 is exposed to form the high friction portion 21*h*. It is preferable that the position of the high friction portion 21*h* to be outside (the opposite electrode side) than the maximum paper passing area W so that the high friction portion 21*h* would always contact the fixing belt 20 even if paper of any size is passed through (refer to FIG. 11). The high friction portion 21*h* is not limited to the case where it is provided on the surface of the pressing roller 21, but it may be provided on a part of the surface of the fixing belt 20 as well.

Subsequently, heater 22 will be described with reference to FIG. 12, which shows a plan view of a fixing device 9C equipped with a heater 22.

In fixing device 9C, as in fixing devices 9A and 9B, in order to balance the heat at the electrode side and the opposite electrode side, the portion of the base 55 is longer to the electrode side (La>Lb), and the pressure roller 21 is shorter to the electrode side (Ga<Gb).

Figure 12:
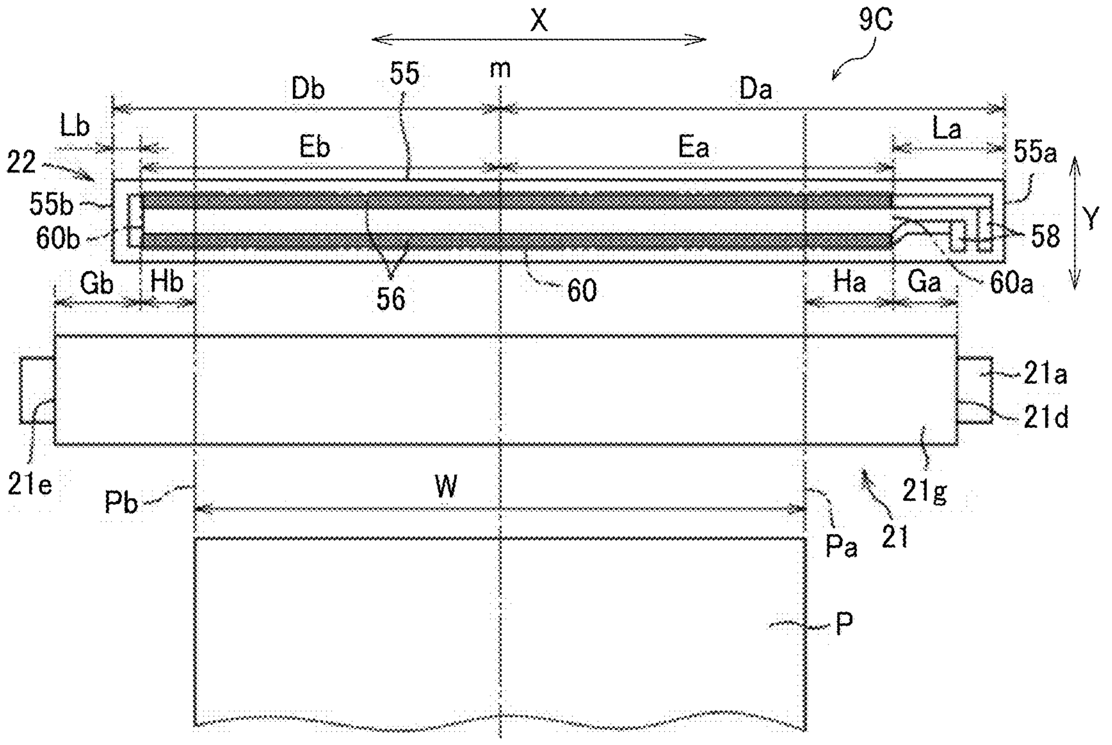
FIG. 12 is a schematic view of a heating device including the third heater.

Further, FIG. 12, in order to increase the temperature of the electrode side which tends to decrease the temperature, the heating region 60 is longer at the electrode side than the opposite electrode side. Therefore, the heating region 60 is not arranged symmetrically with respect to the width direction center m of the maximum threading region W. That is, the length Ea from the center m in the width direction of the maximum threading region W to the end 60*a* at the electrode side of the heating region 60 is set to be longer than the length Eb from the center m in the width direction of the maximum threading region W to the end 60*b* at the opposite electrode side of the heating region 60 (Ea>Eb). Therefore, the length Ha, between the end Pa on the electrode side of the maximum threading region W and the end 60*a* on the electrode side of the heating region 60, is set to be longer than the length Hb, between the end Pb on the opposite electrode side of the maximum threading region W and the end 60*b* on the opposite electrode side of the heating region 60 (Ha>Hb). Here, the relationship between the left and right lengths of the heating region 60 is described with reference to the maximum threading region W, but since the central reference conveying system is used, the relationship between the left and right lengths of the heating region 60 would also be the same, even if the threading region (sheet passing region) of the other width size is used as a reference.

As described above, in FIG. 12, since the heating region 60 is formed to be long toward the electrode side, it is possible to suppress the temperature drop on the electrode side more effectively. Further, such a constitution particularly suitable in a case if shortening the pressure roller 21 on the electrode side, as above, could not achieve effective suppression of the temperature drop on the electrode side. That is, according to FIG. 12, it is possible to suppress the temperature drop on the electrode side even more effectively by making the heating region 60 longer on the electrode side (Ha>Hb) in addition to shortening the pressure roller 21 on the electrode side (Ga<Gb).

Next, a feature of the present disclosure will be described in detail with reference a problem with conventional technology. For example, a fixing device of JP-A-2020-052347 is exemplified. This publication discloses a fixing device including a heating device with a pair of frames at both ends in the longitudinal direction (the rotation axis direction) of the fixing belt. While assembling the fixing device, the heating device excluding the pair of frames is inserted into the pair of frames in the thickness direction of the heater while being fitted to the frame in the transverse direction of the heater (orthogonal to the longitudinal direction and the thickness direction).

The frame is used as the device frame of the heating device and is also as a part of the device frame of the fixing device. The pair of frames includes a flange that is inserted into the inner periphery of the fixing belt to support the fixing belt.

Figure 13:
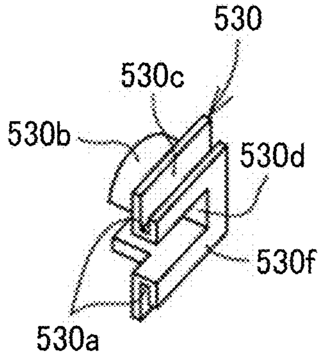
FIG. 13 is a perspective schematic view of a flange.

The constitution of a conventional flange 530 will be described below. As shown in FIG. 13, the flange 530 has, a substantially U-shaped belt supporting portion 530*b* that is inserted into the inner periphery of the fixing belt 20 to support the fixing belt 20, a belt restricting portion 530*c* that is in contact with the end surface of the fixing belt 20 and regulates the movement (deviation) of the fixing belt in the rotation axis direction of the fixing belt, and a supporting recess 530*d*, in which the end of the heater holder 23 and the end of the stay 24 are to be inserted therein, to support them. Further, the flange 530 includes a guide groove 530*a* formed between a guide groove forming portion 530*f* and the belt restricting portion 530*c*. Flange 530 is assembled to the frame by entering the guide groove 530*a* along the edge of the insertion recess 80*a* of the frame.

FIGS. 14A-14D will be referred to in order to illustrate problems with respect to the shape of the flange 530.

Figure 14A:
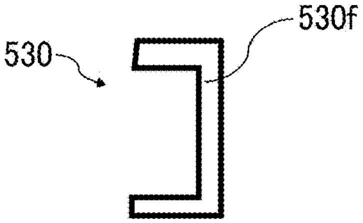
FIGS. 14A-14D illustrate cross-sectional views of a fixing device showing a problem related to the flange.
Figure 14B:
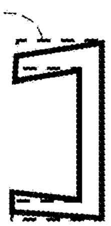

The flange is often formed, by resin material, in a substantially U-shape as described above when viewed from the rotational axis direction of the fixing belt (see FIG. 14A). Therefore, the flange 530, which has a substantially U-shaped shape (portion of the U-shaped cut) as described above, often tends to be deformed in a way that the tip portion of the flange comes closer together (see FIG. 14B) by receiving a pressing force from the pressure roller or by the shrinkage during molding process.

Figure 14C:
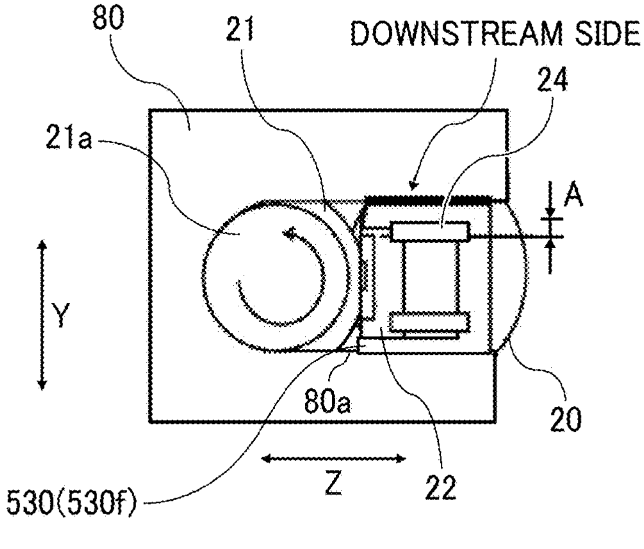
Figure 14D:
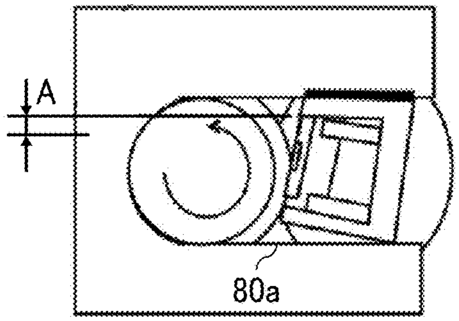

The fixing device is configured such that the heater is positioned in the heater holder, the heater holder is positioned in the stay for supporting the heater holder, the stay is positioned in the flange, and the flange is positioned in the frame (refer to FIG. 14C)). Here, when the pressure roller 21 rotates, the heater 22 is to be moved by the rotation of the pressure roller 21, which makes the flange 530 to contact toward the frame 80 at the downstream side in the rotation direction of the pressure roller 21. Therefore, if the flange 530 was deformed, the heater may be displaced from the predetermined position (shiftable range A is shown in FIGS. 14C and D). If the position of the heater is shifted, the heat of the heater may not be sufficiently transferred to the fixing belt, and thus it may result in causing unsuccessful fixing failure. Further, if the position of the heater is shifted, partial excessive temperature rise may occur, and which might damage the heater by thermal stress due to the excessive temperature rise.

Figure 15A:
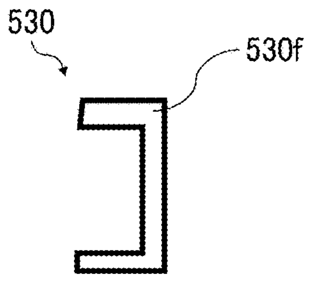
FIG. 15A is a schematic view of a flange including a beam.
Figure 15B:
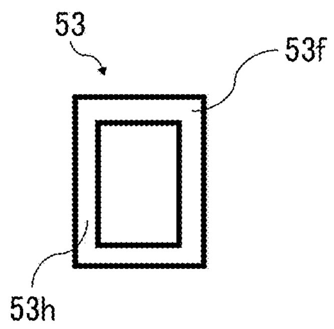
FIG. 15B is a schematic view of a conventional flange without a beam.

Here, FIGS. 15A and 15B show diagrams for explaining a flange including a beam. As shown in FIGS. 15A and 15B, for the problem described above, the flange 53 including a beam, connecting the distal end of the U-shaped cuts (see FIG. 15A), to make substantially O-shaped configuration (see FIG. 15B), prevents deformation of the flange.

Figure 16A:
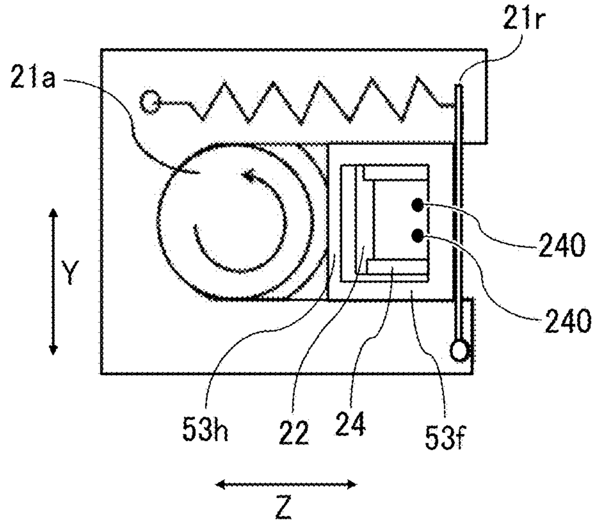
FIGS. 16A and 16B illustrate cross-sectional views of a fixing device showing a problem related to the conductive wire.
Figure 16B:
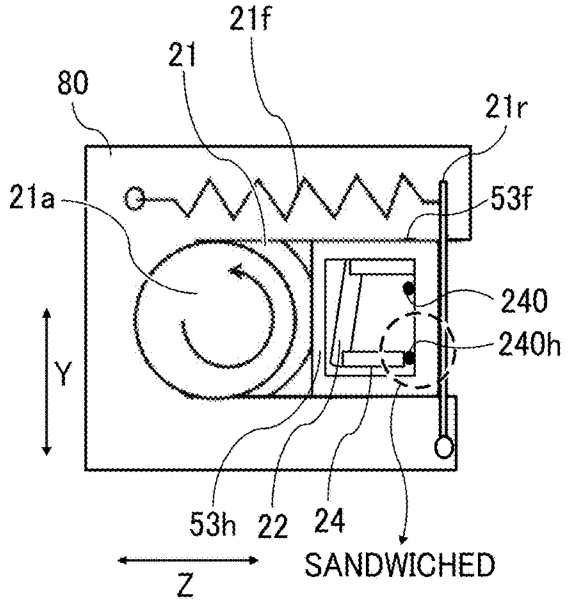

Further, the fixing device may have the following problems. The following problems will be described with reference to FIGS. 16A and 16B. The heater is provided with a thermistor or thermostat for detecting the temperature in order to improve safety. Generally, the wiring such as the lead wires are connected to the thermistor or thermostat, and the lead wires pass nearby the flanges, heater holder and the periphery of the metal stay. Normally, for example of the lead wire 240, the lead wire passes through a predetermined position of the space between the heater holder and the stay, so that the heater holder and the stay contact to each other. But if not, for example of the lead wire 240*h*, the lead wire might be sandwiched between the stay and the flange. If the lead wire was sandwiched between the stay and the flange, the insulating coating of the lead wire might get damage by being pressured via the pressure roller. In this case, the conductive wire might be exposed from the insulating coating of the lead wire by the damage, and the conductive wire might electrically contact to the metal stay, and an electrical disconnection may occur if the stay was electrically grounded.

In order to prevent the above-described disconnection, it is preferable to have a construction which makes it easy to be recognized when the lead wire was not passing a predetermined position. Here, as described above, the flange may include a beam in order to prevent deformation. Then, the inventor found that it is possible to recognize the above-mentioned situation, by defining a relationship between a size of an outer diameter of the a lead wire and a size of a gap formed between the flange and the heater of this construction. The details will be described below.

Figure 17:
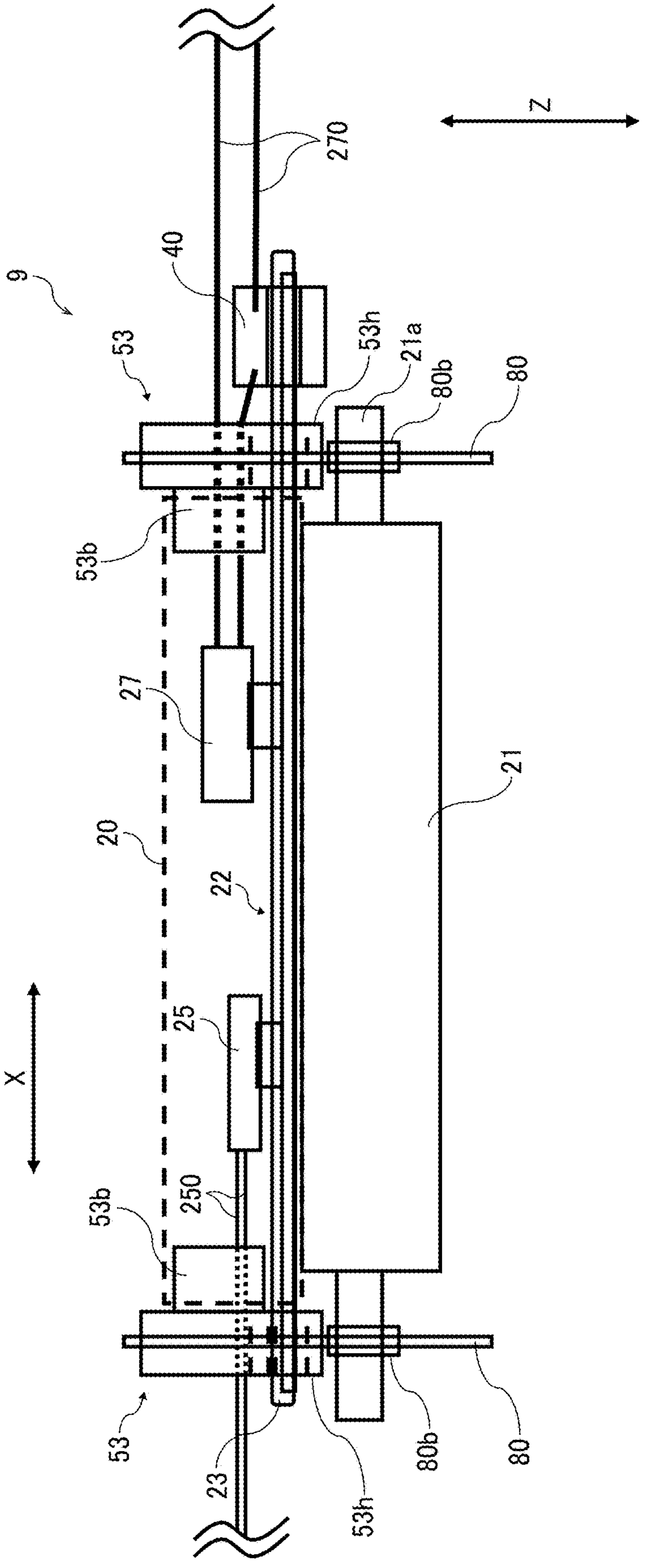
FIG. 17 is a schematic perspective view of a heating device according to a feature of the present disclosure.

FIG. 17 is a diagram showing a fixing device including the features of the present disclosure. Hereinafter, the details of the features will be described. For convenience of explanation, the stay is omitted in FIG. 17.

First, the heating device 9 of FIG. 17 is used as a fixing device 9. The heating device 9 includes a fixing belt 20 (an example of a tubular member, also referred to as a heating belt), a heater 22 (an example of a heating body), and a flange 53 (an example of an edge portion holding member). The flange 53 is biased by the biasing member such as the pressure lever 21*r* and the spring 21*f* (see FIG. 16A). So by switching the lever 21*r*, the fixing device 9 could be switched from non-pressuring state (the state that flange is not biased by the spring) to pressuring state (the state that flange is biased by the spring) or also in a reverse way. The heating device 9 has a stay 24 (an example of a reinforcing member), which is a member having a greater rigidity than the heater holder 23 (an example of a heater holding member for holding the heater 22), for supporting the heater holder 23.

The fixing belt 20 is an endless cylindrical member which is rotatable and has a rotation axis direction. In addition, the heater 22 has a plurality of heat generators (resistance heating elements) and heats the fixing belt 20. Then, the flange 53, for holding the heater and the end portion of the fixing belt 20 22 in the rotation axis direction of the fixing belt 20, the flange 53 has a beam 53*h* (an example of a bridging portion) which makes the flange 53 to have an opening in which the portion for holding the heater 22 to be inserted. The stay 24 and the lead wire extend from inside of the fixing belt 20 to the outside (the side opposite to the side where the fixing belt 20 is positioned in the rotation axis direction when viewed from the bridge portion 53*h*) of the fixing belt 20 in the rotation axis direction through the opening.

The fixing device 9 further includes a pressing roller 21 that is a pressing rotating body disposed to face the fixing belt 20 and contacts to the fixing belt 20 to form a fixing nip, and a frame 80 that is a side plate that movably holds the flange 53. Furthermore, the frame 80 has a bearing 80*b* for receiving a core shaft 21*a* which is a rotation axis of the pressure roller 21.

Next, a lead wire connected to a temperature detection member included in the fixing device according of the present disclosure will be described.

First, the fixing device 9 includes a thermistor 25 and a thermostat 27 as the temperature detecting members. The fixing device 9 further includes, a thermistor lead wire 250 that is connected to the thermistor 25, and a thermostat lead wire 270 that is connected to the thermostat 27. Note that, two thermistor lead wires 250 (an example of the second lead wire) and two thermostat lead wires 270 (an example of the first lead wire) are provided respectively, but it does not mean that the disclosure is not limited thereto.

First, the two of the thermistor lead wire 250 both pass through the flange 53 and are connected to the heater 22. Then, the thermistor 25 detects the temperature of the heater 22. The control unit controls the temperature of the heater 22 to an appropriate temperature based on the temperature detected by the thermistor 25. Further, the voltage applied to the thermistor 25 is about 5V, and since 5V is lower than the voltage applied to the thermostat 27, the thermistor lead wire 250 could use thinner lead wire than the thermostat lead wire 270. Here, the outer diameter of the thermistor lead wire 250 is both about φ1 mm. Note that φ1 mm is just an example, and the present disclosure is not limited to it.

Next, the thermostat lead wire 270, one of the two lead wire 270 is connected to the heater 22 without relaying the connector 40, the other is connected to the connector 40 first and then connected to the heater 22. Both leads pass through the opening of the flange 53 and connect to the heater 22. With this configuration, a voltage of 100V is applied to the heater 22. Then, for example, when the heater 22 is excessively heated by some abnormality occurs, by the cut-off of the thermostat 27, connected to the heater 22 through the thermostat lead wire 270, cutout the electricity to the heater 22. With this configuration, safety of the fixing device 9 is ensured. Here, the outer diameter of the thermostat lead wire 270 is both about φ2 mm. Note that φ2 mm is just an example, and the present disclosure is not limited to it.

Figure 18A:
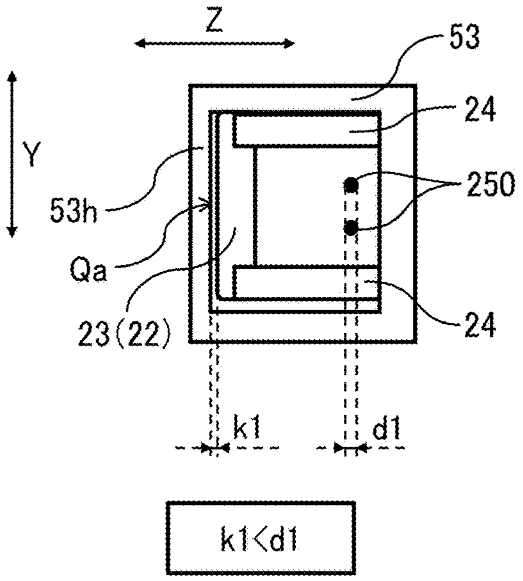
FIGS. 18A and 18B illustrate schematic views of a first flange.
Figure 18B:
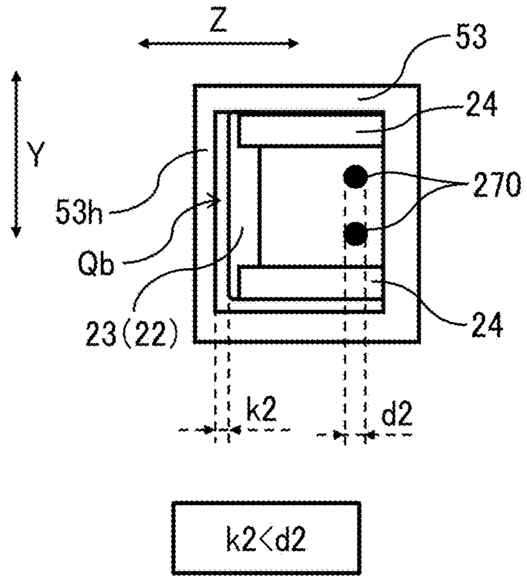

FIGS. 18A and 18B illustrate a configuration when the vicinity of the flange 53 is viewed from the rotation axis direction of the fixing belt. In particular, FIG. 18A shows the flange 53 where the thermistor lead wire 250 passes, and FIG. 18B shows the flange 53 near where the thermostat lead wire 270 passes. The relationship between the size of the outer diameter of the lead wire and a gap formed between the beam of the flange and the heater (actually, the heater holder) will be described by using these figures. Note that the gap a gap formed when the heater is put aside into a separate direction with respect to the flange (see FIG. 18A which would be a same gap formed between the end of the stay 24 and the flange when the heater, heater holder and the stay were put aside into the opposite direction).

As shown in FIG. 18A, the flange 53 of the thermistor lead wire 250 side, a gap Qa is formed between the heater holder 23 (heater 22) and the beam 53*h* of the flange 53. Here, the size of the gap Qa is assumed to be k1. Further, the size of the outer diameter of the thermistor lead wire 250 as described above is about φ1 mm and it is described as d1. As you see, it is possible to prevent sandwiching the thermistor lead wire 250 between the flange 53 and the stay 24 when the relationship between k1 and d1 satisfies $k1<d1$. Therefore, the size of the gap is set in consideration of the outer diameter of the lead wire, and the size of the gap Qa was set to 0.5 mm. Incidentally, the size of the gap was set to be a predetermined value at the stage of designing the construction such as the flange 53 and the heater 22. Thus, since the size of the gap is set to be smaller than the size of the outer diameter of the lead wire, it is possible to prevent sandwiching the lead wire with the stay 24 and the flange 53 when attaching the thermistor lead wire 250.

As to a range of the size of the outer diameter of the thermistor lead wire 250, φ0.6 to 1.8 mm is applied. Therefore, the gap Qa may be set to a value smaller than this range. Since a gap is required between the beam 53*h* and the heater holder 23, so the gap Qa needs to be larger than 0.

As shown in FIG. 18B, the flange 53 of the thermostat lead wire 270 side, a gap Qb is formed between the beam 53*h* and the heater holder 23 of the flange 53. Here, the size of the gap Qb is assumed to be k2. As you see, it is possible to prevent sandwiching the thermostat lead wire 270 between the flange 53 and the stay 24 when the relationship between k2 and d2 satisfies $k2<d2$. Therefore, the size of the gap is set in consideration of the outer diameter of the lead wire as in a same way as described in FIG. 18A, and the size of the gap Qb was set to 1 mm. Note that the size of the gap Qb is larger than that of the gap Qa. Incidentally, the size of the gap was set to be a predetermined value at the stage of designing the construction such as the flange 53 and the heater 22. Thus, since the size of the gap is set to be smaller than the size of the outer diameter of the lead wire, it is possible to prevent sandwiching the lead wire with the stay 24 and the flange 53 when attaching the thermostat lead wire 270. Further, the size of the gap Qb is set under the consideration of the size of the outer diameter of the thermostat lead wire 270. That is, since the size of the gap on both sides are different, the optimal size of the gap could be secured by the configuration (size) of the lead wire, and doing so, the optimal mounting of the flange would be obtained.

As to the range of the size of the outer diameter of the t thermostat lead wire 270, φ2 to 4 mm is applied. Therefore, the gap Qb may be set to a value smaller than this range. Since a gap is required between the beam 53*h* and the heater holder 23, so the gap Qb needs to be larger than 0. Based on this, the gap Qb is set to, for example, a range of 0.1 to 1.9 mm.

Figure 19:
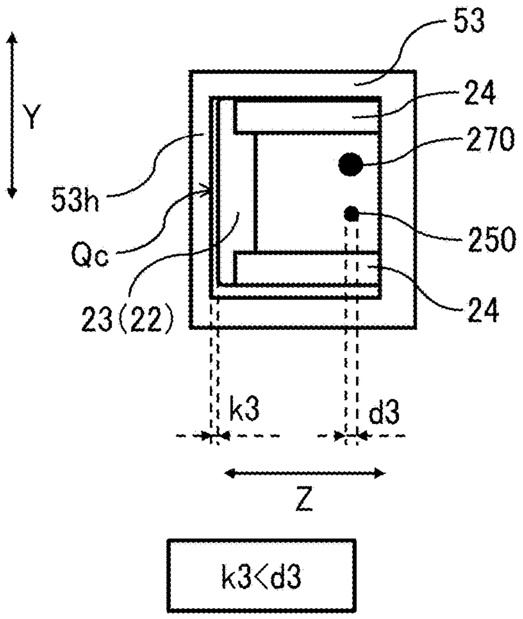
FIG. 19 is a schematic view of a second flange.

FIG. 19 illustrates another configuration when a vicinity of the flange 53 is viewed from the rotation axis direction of the fixing belt 20. Incidentally, FIG. 19 shows a construction in which one of the thermostat lead wire 270 and one of the thermistor lead wire 250 pass through one of the two flanges (flange of the thermostat lead wire side). That is, the figure shows the case of a plurality of lead wires having different sizes of the outer diameter passing through the flange.

As shown in FIG. 19, a thermostat lead wire 270 and the thermistor lead wire 250 are passing through the flange 53 of the thermostat lead wire side. Further, a gap Qc is formed between the beam 53*h* of the flange 53 and the heater holder 23 (heater 22). Here, the size of the outer diameter of the thermostat lead wire 270 is about φ2 mm, and the size of the outer diameter of the thermistor lead wire 250 is about φ1 mm, so the thermistor lead wire 250 has a smaller size of the outer diameter. Therefore, it is possible to prevent neither of the lead wires to be sandwiched between the stay 24 and the flange 53 if the gap is made to be smaller than the outer diameter of the smallest size lead wire. Further, the optimal size of the gap could be secured by the configuration (size) of the lead wires, and doing so, the optimal mounting of the flange would be obtained.

Therefore, assuming the size of the gap Qc as k3 and the size of the outer diameter of the thermistor lead wire 250 which has the smallest outer diameter as d3, the relationship k3<d3 is satisfied between these parameters. The size of the gap Qc is set to, for example, 0.5 mm. Incidentally, the size of the gap is set to be a predetermined value at the stage of designing the construction such as the flange 53 and the heater 22. In this way, all the wires are prevented from being sandwiched between the flange and the stay.

Note that, in FIG. 19, two types of lead wires having different sizes of outer diameters pass through the flange on one end side, but it is applicable also even when three or more types of lead wires having different sizes of outer diameters are used. Further, the flange 53 of the thermostat lead wire side was described, but the above-described features are applicable to the flange of the other side (the thermistor lead wire side).

Further, according to FIG. 19, the size of the gap Qc is set to be larger than the size of the outer diameter of the thermistor lead wire 250 (the smallest outer diameter) but smaller than the size of the outer diameter of the thermostat lead wire 270 (the largest outer diameter). But, the size of the outer diameter of both lead wires may be the same. Therefore, the size of the gap Qc may be set to be, for example, 1.2 mm. Incidentally, the size of the gap was set to be a predetermined value at the stage of designing the construction such as the flange 53 and the heater 22. Since the lead wire of the smallest outer diameter size is smaller than the gap size, the lead wire might enter between the stay and the flange. However, since the lead wire having the largest outer diameter is larger than the gap, the lead wire having the largest outer diameter is prevented from being sandwiched between the stay and the flange. A lead wire having a large outside diameter used for a high voltage and which might cause a large impact by disconnection due to sandwiching, whereas leads with a lead wire having a small outside diameter tends to cause only a small impact. Therefore, it is possible to improve the assembling of the device while preventing sandwiching of the lead wire having the largest size of the outer diameter, which may cause large impact by disconnection, with the above-described configuration.

Figure 20A:
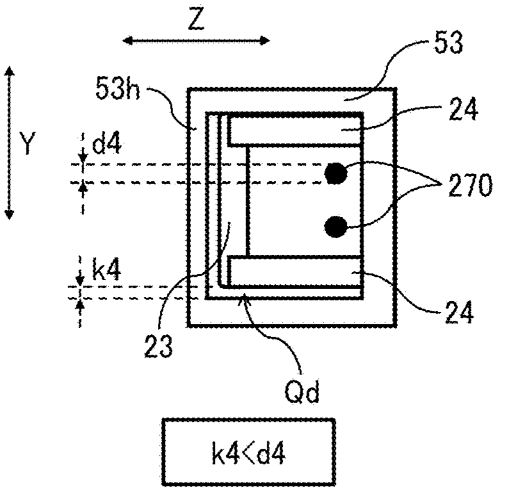
FIGS. 20A and 20B show a schematic view of a third flange.
Figure 20B:
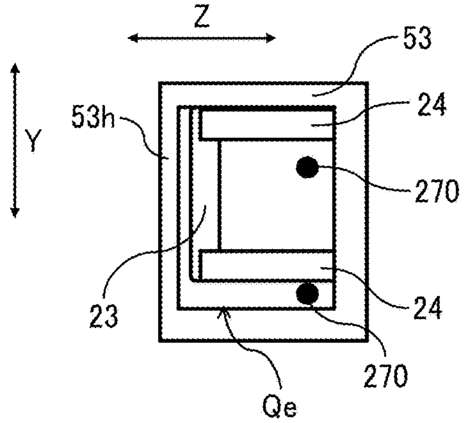

FIGS. 20A and 20B show another configuration when the vicinity of the flange is viewed from the rotation axis direction of the fixing belt. FIG. 20A shows the vicinity of the flange on the side where the lead wire for thermostat passes, and FIG. 20B shows the problem when the lead wire passes through the gap formed between the flange and the stay. The relationship between the size of the outer diameter of the lead wire and the gap formed between the flange and the stay, will be described by using these figures. Note that the gap in FIGS. 20A and 20B refers to a gap formed when the stay is brought into contact with one side of the flange.

As shown in FIG. 20B, the flange 53 of the thermostat lead wire 270 side, the gap Qe is formed between the flange 53 and the stay 24. If the size of the gap Qe is greater than the size of the outer diameter of the thermostat lead wire 270, there is a possibility that the thermostat lead wire 270 is twisted into (pass through) the gap Qe. Burrs are removed from the stay at the predetermined position and their peripherals supposing that the lead wire passes around the predetermined position and their peripherals, but burrs may remain in places where the lead wire was not supposed to passed through. Therefore, when the thermostat lead wire 270 touches to the remaining burr, the coating of the lead wire may tear and cause disconnection, which may eventually lead to failure.

Here, the size of the gap Qd is assumed to be k4. Further, the size of the outer diameter of the thermostat lead wire 270 is about φ2 mm and it will be described as d4. If the relationship between k4 and d4 satisfies k4<d4, then it is possible to prevent the thermostat lead wire 270 from passing between the flange 53 and the stay 24. Therefore, the size of the gap Qd was set based on the outer diameter of the lead wire, so that the size of the gap Qd was set to, for example, 1.0 mm. The size of the gap Qd is desirable to be set in the range of 1.0 mm or less but greater than 0 (greater than 0 is, for example, 0.01 mm). Incidentally, the size of the gap was set to be a predetermined value at the stage of designing the construction such as the flange 53 and the stay 24.

Thus, since the size of the gap is set to be smaller than the size of the outer diameter of the lead wire, it is possible to prevent the thermostat lead wire 270 from passing between the stay 24 and the flange 53 when attaching the thermostat lead wire 270 (prevent from being attached in a wrong way).

Figure 21A:
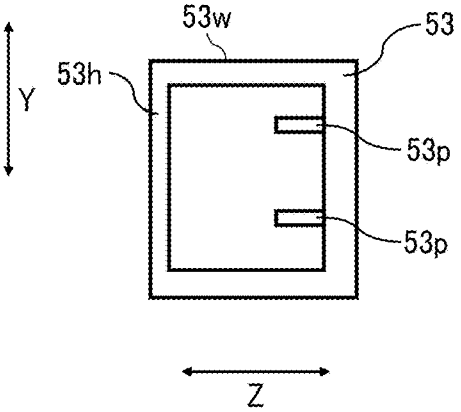
FIG. 21A is a cross-sectional view of a flange having a restrictor.
Figure 21B:
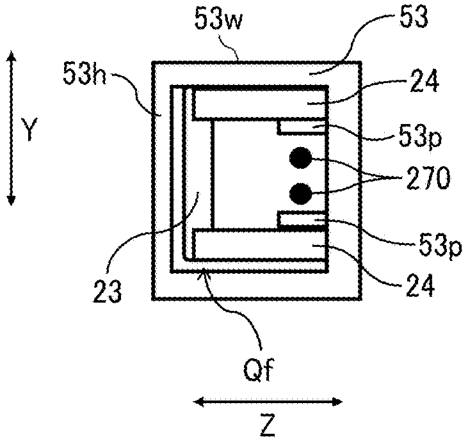
FIG. 21B is a cross-sectional view of a fixing device illustrating how to restrict the movement of the stay by using the flange having the restrictor.

FIGS. 21A and 21B are diagrams showing the positioning of the stay relative to the flange. In particular, FIG. 21A shows the construction of the flange, FIG. 21B is a diagram shows how to position the stay relative to the flange. The positioning of the stay with respect to the flange will be described by using these figures.

First, as shown in FIG. 21A, the flange 53 has a positioning ribs 53*p*. The positioning ribs 53*p* are respectively provided on both sides in the lateral direction (Y direction) of the heater 22. Then, one of the positioning ribs 53*p* is disposed with an interval between the flange 53 (the one of the flange inner wall) and the one of the positioning ribs 53*p* is substantially equal to the width size of the stay 24 (width of the metal plate) in order to allow the positioning of the stay 24 accurately. Further, as to the other one of the positioning rib 53*p*, the interval between the flange 53 (the other one of the flange inner wall) and the other one of the positioning rib 53*p* is sized to have a little margin than the width size of the stay 24. In other implementations for positioning the stay using positioning rib, for example, at least one pair of the positioning ribs 53*p* is disposed with an outer interval therebetween substantially equal to inner interval between the tips of the stay 24.

The position of the stay relative to the flange is determined as follows. First, as shown in FIG. 21B, inserting the stay 24 into the gap formed between the flange 53 (sidewall 53*w*) and the positioning rib 53*p*, so that the stay 24 to be sandwiched between the sidewall 53*w* and the positioning rib 53*p*. Then, the stay 24 is disposed closer to one side of the sidewall 53*w*, thereby the stay 24 is positioned to the predetermined position. At the sidewall 53*w* side, the size of the gap between the sidewall 53*w* and the positioning ribs 53*p* has a gap of substantially equal to the size of the stay 24. In addition, since the other side (the side opposite to the sidewall 53*w*) has a slight margin between the another sidewall and the another positioning rib 53*p*, the stay 24 could be inserted smoothly.

Then, a gap would be formed between the sidewall opposite to the sidewall 53*w* and the stay 24. By bringing the stay 24 to the sidewall 53*w* side (left side) of the flange 53, a gap Qf was formed on the other side (right side). Note that the gap Qf was formed on the right side, but it is also applicable to a configuration which has the gap Qf on the opposite side. Further, when the gap was formed on both sides between the stay 24 and the sidewalls (sidewall 53*w* and the sidewall opposite to the sidewall 53*w*), when the stay is brought close to either one of the sidewalls toward either one side to form the gap on either other side (opposite to the either one side), and if the outer diameter of the lead wire was larger than the largest gap, then the lead wire would not enter into either of the gap.

FIGS. 21A and 21B have been described with the flange on the side where the lead wire for thermostat passes, but the disclosure is also appliable for the flange on the side where the lead wire for thermistor passes. Then, since the size of the outer diameter of the lead wire is different at each of the flanges, the gap may have different sizes for each flange. With this construction, the optimal size of the gap could be secured by the configuration (size) of the lead wire, and doing so, the optimal mounting of the flange would be obtained.

Figure 22:
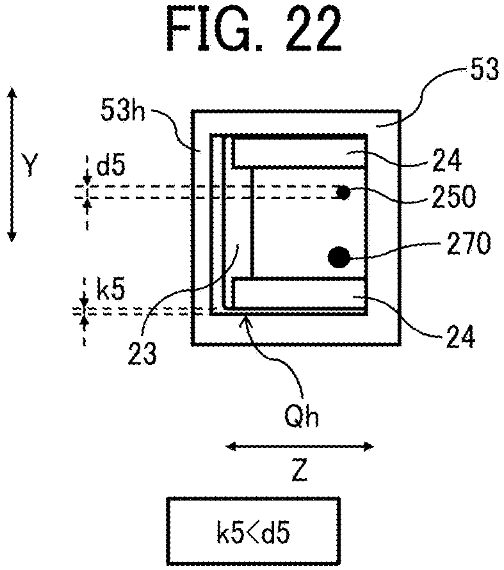
FIG. 22 is a schematic view of a fourth flange.

FIG. 22 shows another configuration when the vicinity of the flange is viewed from the rotation axis direction of the fixing belt. In particular, FIG. 22 shows a construction in which one of the thermostat lead wire 270 and one of the thermistor lead wire 250 pass through one of the two flanges (flange of the thermostat lead wire side). That is, the figure shows the case of a plurality of lead wires having different sizes of the outer diameter passing through the flange.

As shown in FIG. 22, a thermostat lead wire 270 and the thermistor lead wire 250 are passing through the flange 53 of the thermostat lead wire side. Further, a gap Qh is formed between the stay 24 and the beam 53*h* of the flange 53. Here, the size of the outer diameter of the thermostat lead wire 270 is about φ2 mm, and the size of the outer diameter of the thermistor lead wire 250 is about φ1 mm, so the thermistor lead wire 250 has a smaller size of the outer diameter. Therefore, it is possible to prevent neither of the lead wires to be placed (twisted) between the stay 24 and the flange 53 if the gap is made to be smaller than the outer diameter of the smallest size lead wire.

Therefore, assuming the size of the gap Qh as k5 and the size of the outer diameter of the thermistor lead wire 250 which has the smallest outer diameter as d5, the relationship k5<d5 is satisfied between these parameters. In FIG. 22, the size of the gap Qh is set to, for example, 0.5 mm. Incidentally, the size of the gap was set to be a predetermined value at the stage of designing the construction such as the flange 53 and the stay 24. In this way, all the wires could be prevented from being twisted between the flange and the stay.

Note that, in FIG. 22, two types of lead wires having different sizes of outer diameters pass through the flange on one end side was described, but it is applicable also even when three or more types of lead wires having different sizes of outer diameters are used. Further, FIG. 22 was described with the flange of the thermostat lead wire side, but it is also applicable to the flange of the other side (the thermistor lead wire side).

In another implementation according to FIG. 22, the size of the gap Qh is larger than the size of the outer diameter of the thermistor lead wire 250 (the smallest outer diameter) but smaller than the size of the outer diameter of the thermostat lead wire 270 (the largest outer diameter). For example, the size of the outer diameter of the thermistor lead wire 250 is φ0.8 mm, the size of the outer diameter of the thermostat lead wire 270 is φ2 mm, the size of the gap Qh is 1.0 mm. Incidentally, the size of the gap was set to be a predetermined value at the stage of designing the construction such as the flange 53 and the stay 24. Since the lead wire of the smallest outer diameter size is smaller than the gap size, the lead wire might enter between the stay and the flange. However, since the lead wire having the largest outer diameter is larger than the gap, the lead wire having the largest outer diameter is prevented from being twisted between the stay and the flange. A lead wire having a large outside diameter used for a high voltage and which might cause a large impact by disconnection due to twisting, whereas leads with a lead wire having a small outside diameter tends to cause only a small impact. Therefore, it is possible to improve the assembling of the device while preventing twisting of the lead wire having the largest size of the outer diameter, which may cause large impact by disconnection, with the above-described configuration.

FIG. 22 was described with the flange of the thermostat lead wire side, but it is also applicable to the flange of the other side (the thermistor lead wire side). In addition, the present disclosure is also applicable to a configuration in which, for example, a lead wire having two or more outer diameters having different sizes comes out of a thermostat or a thermistor.

Beam of the Flange

The relationship between the beam and the size of the outer diameter of the lead wire will be described below. Although the flanges are provided on both ends of the fixing belt, the following description is adaptable to both constructions.

First, the width of the beam 53*h* of the flange 53 is larger than the largest outer diameter of the plurality of lead wires. Here, the width of the beam 53*h* is to the length of the beam in the longitudinal direction of the heater (X direction). The reason for such features of the beam described below is because, with these features, it is possible to suppress deformation of the flange. For example, the width of the beam 53*h* is set to 4 mm.

The thickness of the beam 53*h* of the flange 53 is greater than the largest outer diameter of the plurality of lead wires. Incidentally, the thickness of the beam 53*h* here is assumed to refer to the size of the thickness direction of the heater (Z direction). The reason for such features of the beam described below is because, with these features, it is possible to suppress deformation of the flange. For example, the beam 53*h* has the thickness between 1.5 to 2 mm.

As described above, the beam of the flange, with the width or the thickness greater than the largest outer diameter of the plurality of lead wires, it is possible to obtain a strength capable of suppressing deformation of the flange.

FIGS. 23A to 23C-5 show a case where a rib is provided in the beam. The beam 53*h* may be provided with a rib. Rib 53*r* improves the strength of the bridging portion 53*h* and suppress the deformation of the flange. The rib 53*r* is larger than the outer diameter of the lead wire and is made of resin.

Figure 23A:
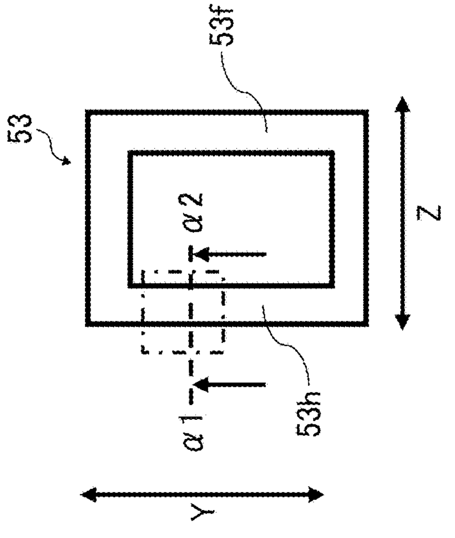
FIG. 23A is a schematic view of a flange including the beam without a rib.
Figure 23B:
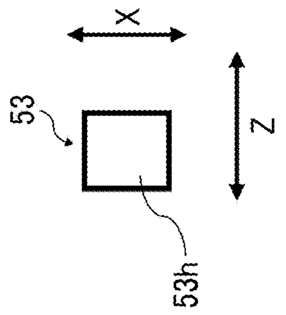
FIG. 23B is cross-sectional view the beam without the rib.
Figure 23B:
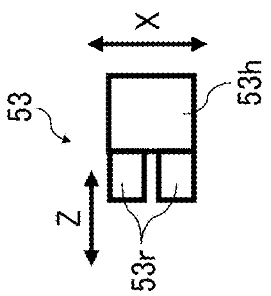
Figure 23B:
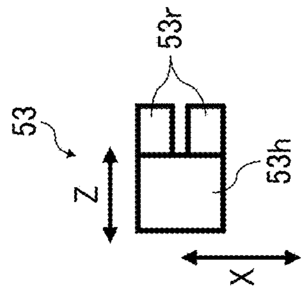
Figure 23B:
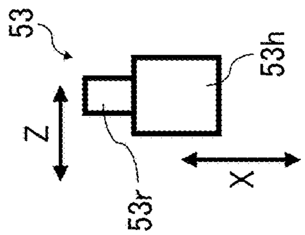
Figure 23B:
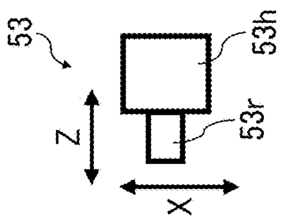
Figure 23B:
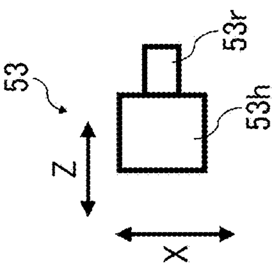

FIG. 23A is a diagram in which a rib is not provided on the beam 53*h*. FIG. 23B is the cross-sectional view cut by the α1-α2 line shown in FIG. 23A. Then, FIG. 23C-1 to 23C-5 show variations of the configuration in which the rib 53*r* is provided on the beam 53*h* of FIG. 23B. As shown in FIGS. 23C-1 to 23C-5 the ribs 53*r* are positioned in various directions of the beam 53*h*. In addition, the number of the ribs 53*r* could be more than 1.

Further, the other features of the flange will be described below. First, the flange 53 may be made of resin. With this resin, the flange 53 can suppress the occurrence of molding shrinkage, creep deformation, and the like. Further, the flange 53 has a beam 53*h* which extends in a direction perpendicular to the rotation axis direction of the fixing belt 20 (lateral direction Y of the heater) so as to overlap the side plate of the frame 80. In this way, it is possible to suppress the deformation of the fitting portion of the frame 80 and increase accuracy of its position.

Another Example of Thermistor Arrangement

Figure 24:
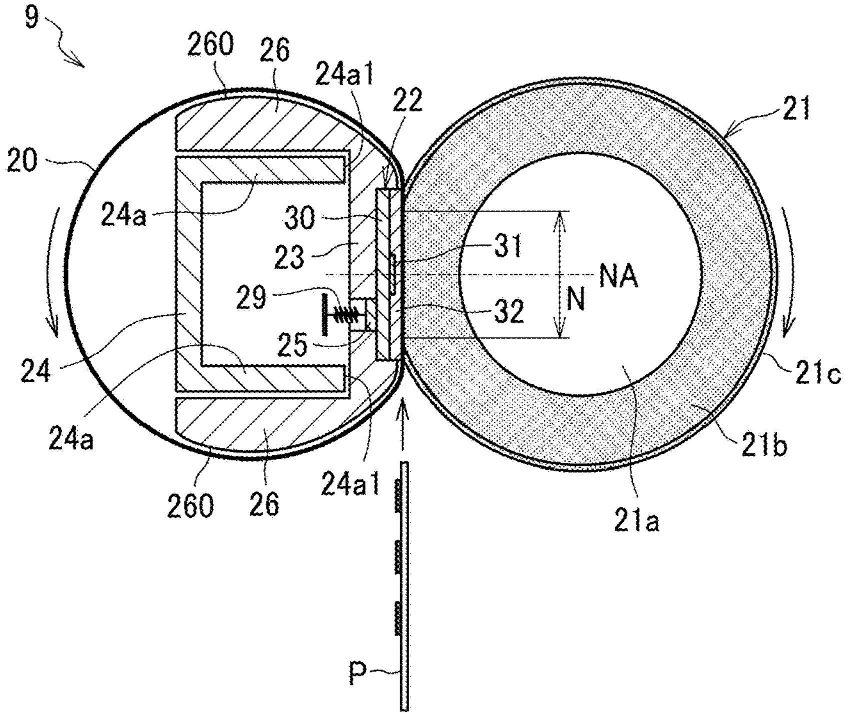
FIG. 24 is another cross-sectional view of a fixing device which has a thermistor shifted from the center.

With respect to the fixing device described above, the arrangement of the thermistors in intersecting direction may be as follows. For example, as illustrated in FIG. 24, the thermistor 25 is provided at the upstream side of the central position NA of the fixing nip N in the rotation direction of the fixing belt 20, in other words, at the entering side (the side paper enters) relative to the fixing nip N. Since the entrance side of the fixing nip N is a region in which heat would particularly easily deprived of by the paper P, by detecting the temperature of this portion with the thermistor 25, the fixing property of the fixing device 9 could be secured and the fixing offset could be effectively suppressed.

Another Example of Fixing Device

Figure 25:
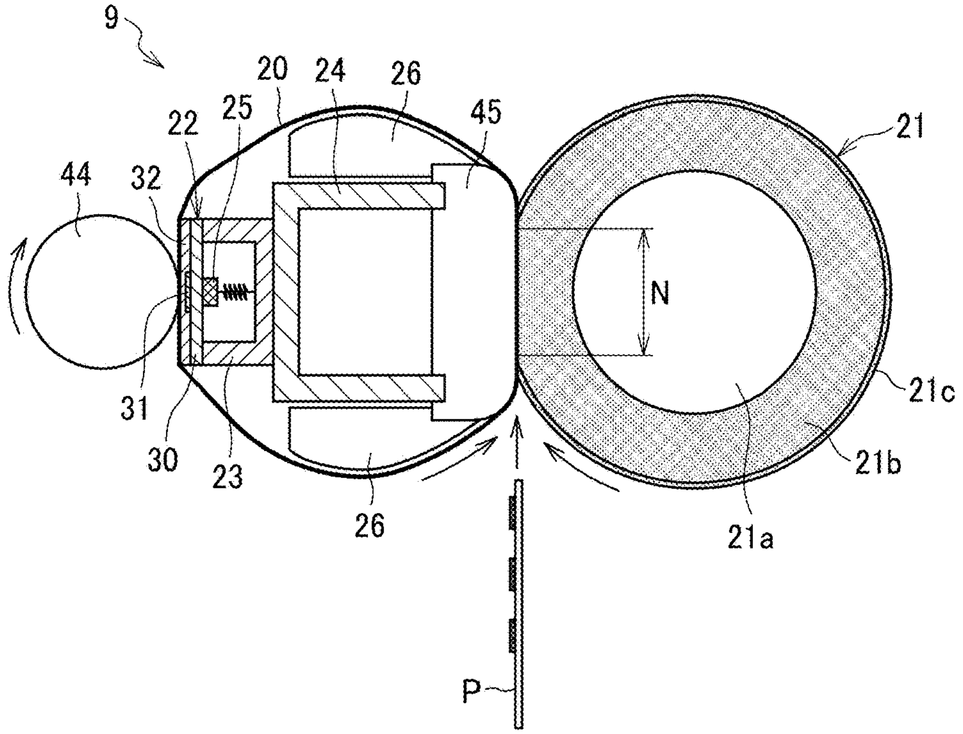
FIG. 25 is a schematic perspective view of another heating device.
Figure 26:
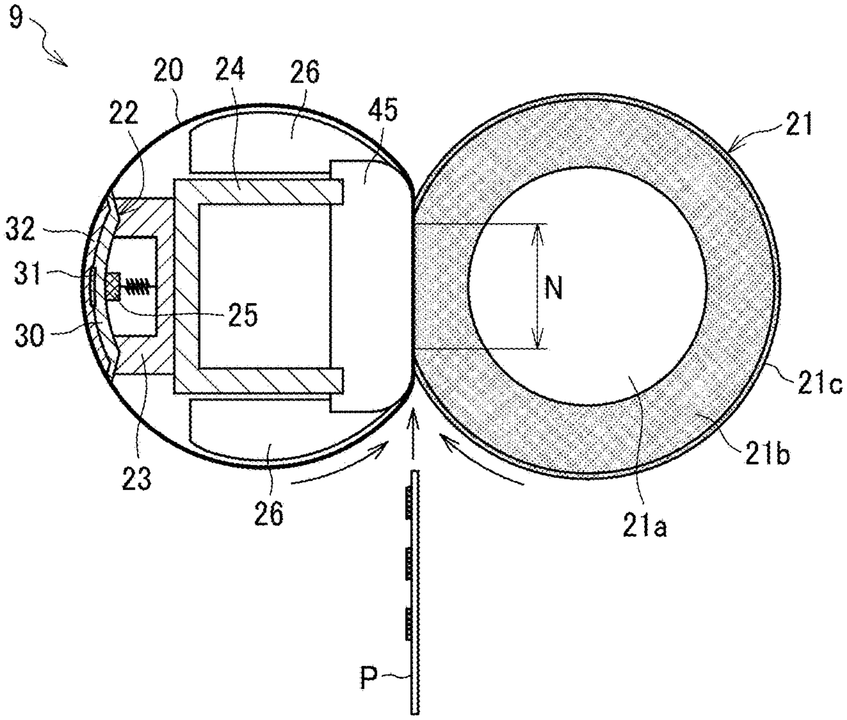
FIG. 26 is a schematic perspective view of another heating device.
Figure 27:
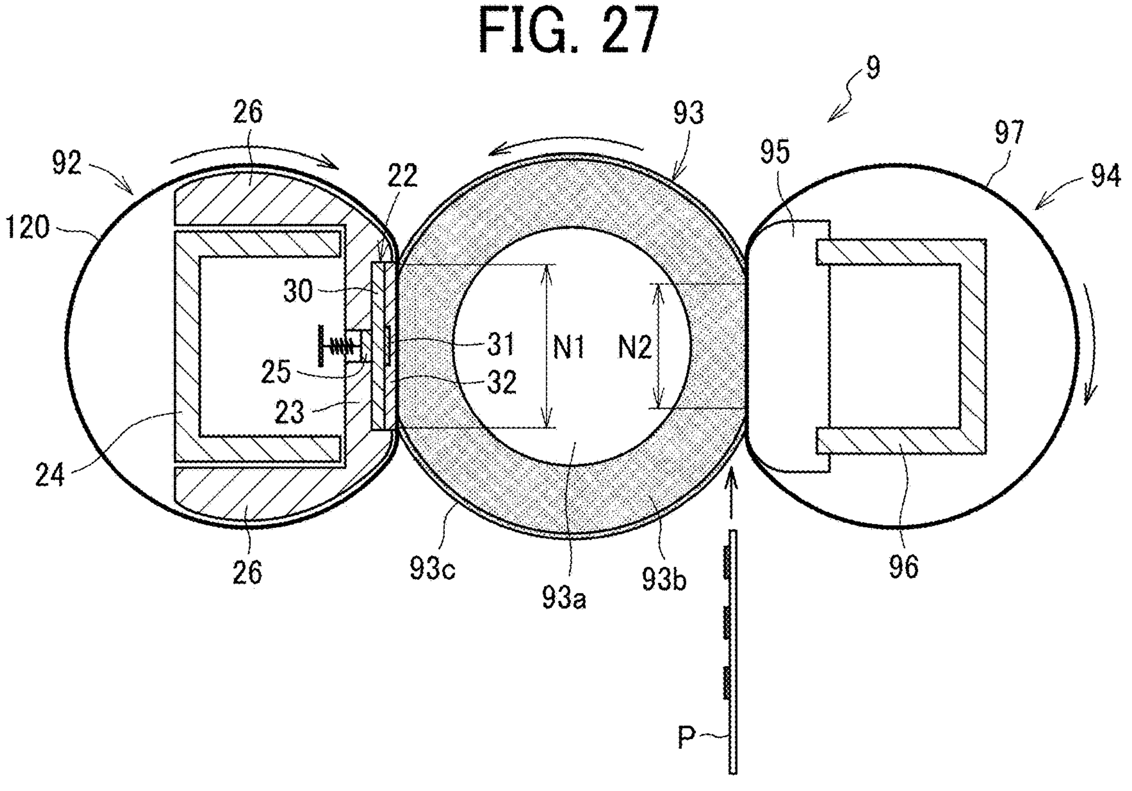
FIG. 27 is a schematic perspective view of another heating device.

Further, other examples of the fixing device are shown in FIGS. 25 to 27.

First, in the fixing device 9 illustrated in FIG. 25, the first pressing roller 44 is disposed on a side opposite to the second pressing roller 21 side with respect to the fixing belt 20. The first pressing roller 44 is an opposing rotating member that rotates and faces the fixing belt 20 as a rotating member. The first pressing roller 44 and the heater 22 are configured to sandwich the fixing belt 20 to heat the fixing belt 20. On the other hand, on the second pressing roller 21 side, the nip forming member 45 is disposed on the inner periphery of the fixing belt 20. The nip forming member 45 is supported by the stay 24. The fixing nip N is formed between the fixing belt 20 by the nip forming member 45 and the second pressing roller 21.

Next, in the fixing device 9 illustrated in FIG. 26, the aforementioned pressing roller 44 is not used, but instead of that, the heater 22 is formed in an arc shape according to the curvature of the fixing belt 20 in order to ensure the circumferential contact length between the fixing belt 20 and the heater 22. Otherwise, the configuration is the same as that of the fixing device 9 shown in FIG. 13.

Finally, the fixing device 9 shown in FIG. 27 will be described below. The fixing device 9 includes a heating assembly 92, a fuser roller 93 as a fixing member, and a pressing assembly 94 as an opposing member. The heating assembly 92 includes a heater 22, a heater holder 23, a stay 24, a heating belt 120 as a rotating member, and the like as described above. The fuser roller 93 is an opposing rotating member that rotates to face the heating belt 120 serving as a rotating member. Further, the fuser roller 93 is constituted by a solid iron core bar 93*a*, an elastic layer 93*b* formed on the surface of the core bar 93*a*, and a release layer 93*c* formed on the outside of the elastic layer 93*b*. A pressure assembly 94 is also provided on the opposite side of the fuser roller 93 from the heating assembly 92 side. Pressure assembly 94 includes a nip forming member 95 and a stay 96 and rotatably places a pressure belt 97 to surround the nip forming member 95 and the stay 96. The paper P passes through the fixing nip N2 between the pressing belt 97 and the fixing roller 93 to be heated and pressurized, then the image would be fixed on the paper P.

Another Example of Image Forming Apparatus

The image forming apparatus according to the present disclosure is not limited to the color image forming apparatus shown in FIG. 1, but may be a monochrome image forming apparatus, a copying machine, a printer, a facsimile, or a multifunction machine thereof.

Figure 28:
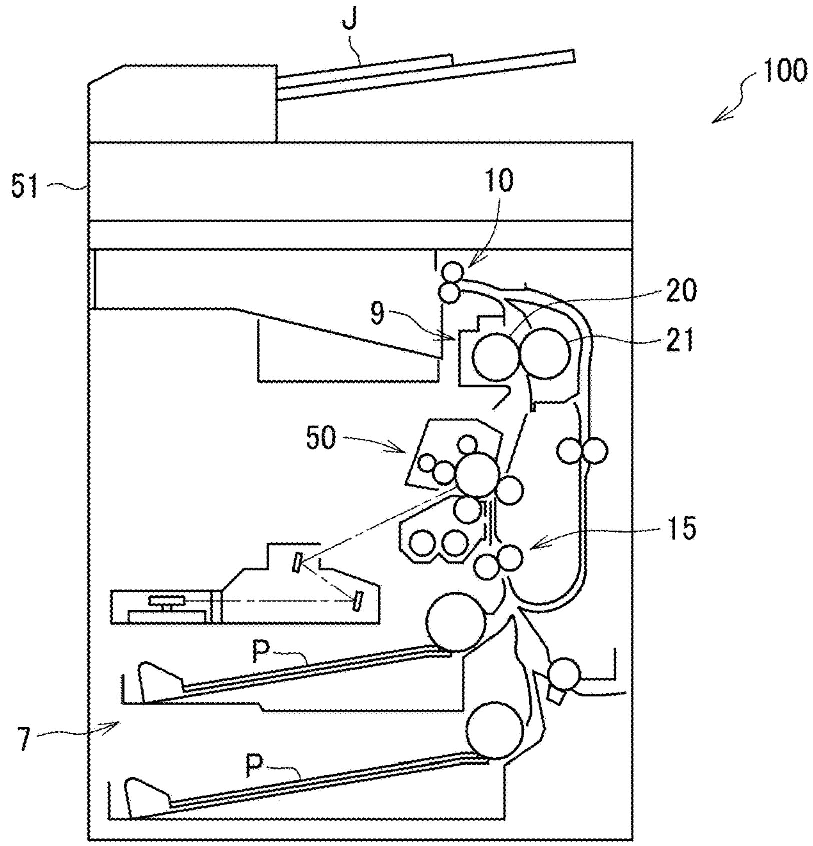
FIG. 28 is a schematic diagram of a configuration of an image forming apparatus different from FIG. 1.

For example, as shown in FIG. 28, the image forming apparatus 100 includes an image forming unit 50 including a photosensitive drum, a paper conveying unit including a pair of timing rollers 15, a feeding device 7, a fixing device 9, a discharging device 10, and a reading unit 51. The paper feeding device 7 includes a plurality of sheet feeding trays, and each sheet feeding tray could accommodate sheets of different sizes.

The reading unit 51 reads an image from the manuscript J. The reading unit 51 generates the image data from the read image. The sheet feeding device 7 accommodates a plurality of papers P and feeds the sheets P to a conveyance path. The timing roller 15 transports the paper P on the conveying path to the image forming unit 50.

The image forming unit 50 forms a toner image on the sheet P. Specifically, the image forming unit 50 includes a photoconductor drum, a charging roller, a photolithography device, a developer, a supply device, a transfer roller, a cleaning device, and an antistatic device. The toner image represents, for example, an image of the manuscript J. The fixing device 9 heats and pressurizes the toner image to fix the toner image on the paper P. The paper P, with the fixed toner image thereon, is conveyed to the discharging device 10 by a transport roller or the like. The paper discharging device 10 discharges the sheet P to the outside of the image forming apparatus 100.

Further Variation of the Fixing Device

Next, a further variation of the fixing device will be described. Some of the description of a construction common to the fixing device described above will be omitted.

Figure 29:
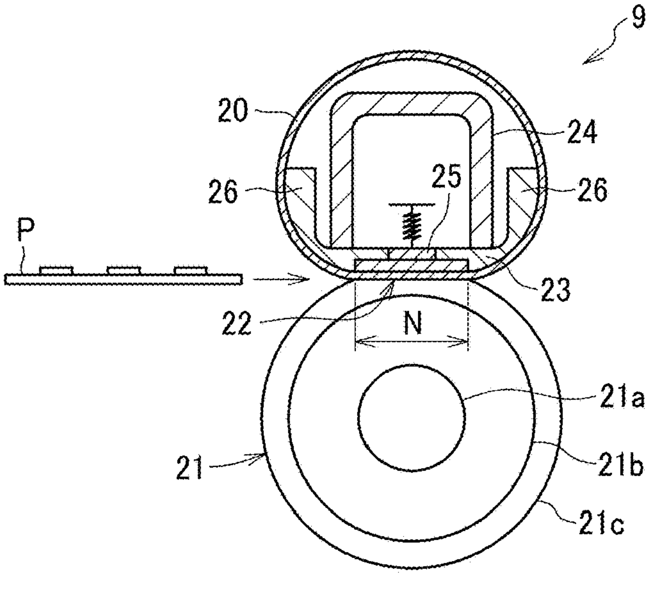
FIG. 29 is a schematic perspective view of another heating device.

As shown in FIG. 29, the fixing device 9 includes a fixing belt 20, a pressing roller 21, a heater 22, a heater holder 23, a stay 24, a thermistor 25, and the like.

A fixing nip N is formed between the fixing belt 20 and the pressing roller 21. The nip width of the fixing nip N is 10 mm, and the linear speed of the fixing device 9 is 240 mm/s.

The fixing belt 20 includes a base body of polyimide and a release layer, and does not have an elastic layer. The release layer is made of a heat-resistant film material including, for example, a fluororesin. The outer diameter of the fixing belt 20 is about 24 mm.

The pressure roller 21 includes a core metal 21*a*, an elastic layer 21*b*, and a release layer 21*c*. The outer diameter of the pressing roller 21 is formed in the range of 24 to 30 mm, and the thickness of the elastic layer 21*b* is formed in the range of 3 to 4 mm.

The heater 22 includes a base material, a heat insulating layer, a conductor layer including a resistance heating element (heat generator) or the like, and an insulating layer, the overall thickness of the heater is about 1 mm. Further, the width Y of the arrangement intersecting direction (Y direction) of the heater 22 is 13 mm.

Figure 30:
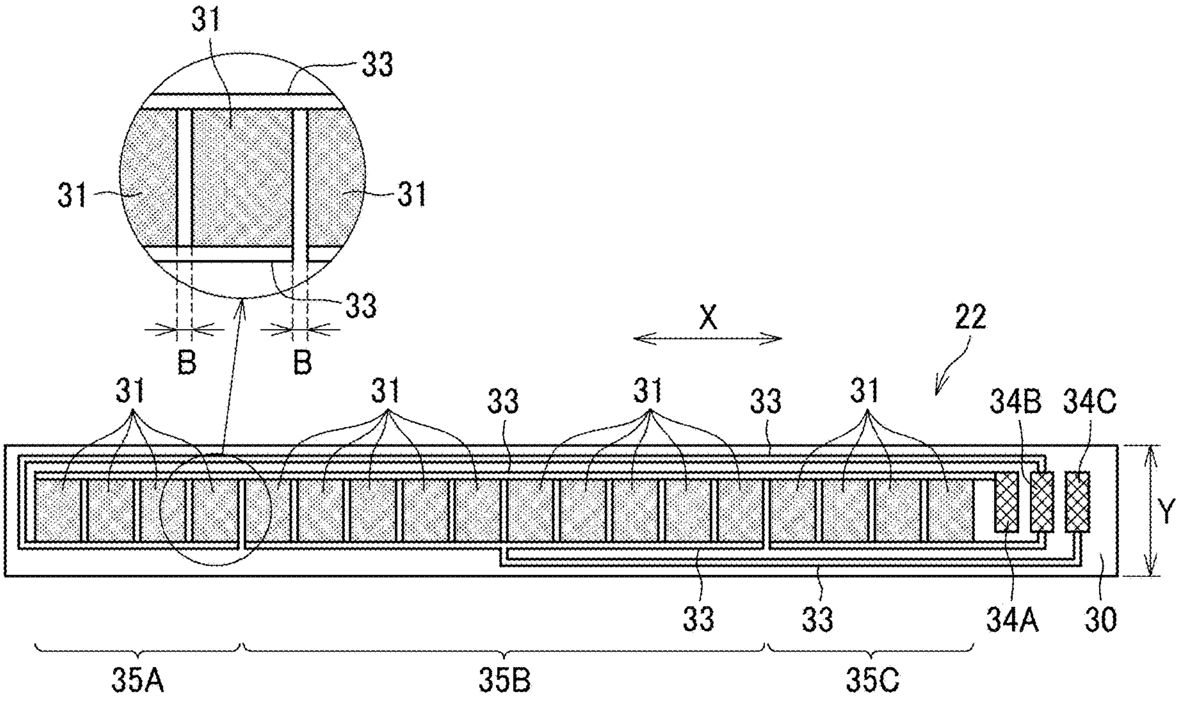
FIG. 30 is a plan view of a fourth heater.

FIG. 30 is a plan view illustrating a fourth heater 22. Incidentally, the heater 22 of FIG. 30 has a configuration having a separated heating region in which a plurality of resistance heating element 31 is separated by the intervals (gap) in the arrangement direction (it is same direction as belt width direction or longitudinal direction of the heater) in the same manner as the heater 22 of FIG. 4. As shown in FIG. 30, the conductive layer of the heater 22 includes a plurality of resistive heating elements 31, the feed line 33, and the electrode portion 34A~34C. Also, as shown in the FIG. 30, the separated heating region is separated into a plurality of resistance heating element 31 by the interval B (gap B) and the plurality of resistance heating element 31 arranged in the arrangement direction (although in FIG. 30 only a part of the separated heating region is shown, all of the resistance heating elements 31 may be provided with the interval B therebetween). The separated heating region is divided into three heating portions 35A~35C, and each of them are constituted by resistive heating elements 31. By energizing the electrode-portion 34A and 34B, the heat-generating portion 35A and 35C generates heat. By energizing the electrode-portion 34A and 34C, the heating-portion 35B generates heat. By energizing the electrode-portion 34A, 34B, and 34C all the heating-portion (35A, 35B and 35C) generate heat. For example, when a fixing operation is performed on a small-size sheet, only the heating unit 35B would generate heat, and when a fixing operation is performed on a large-size sheet, all the heating units would generate heat.

Figure 31:
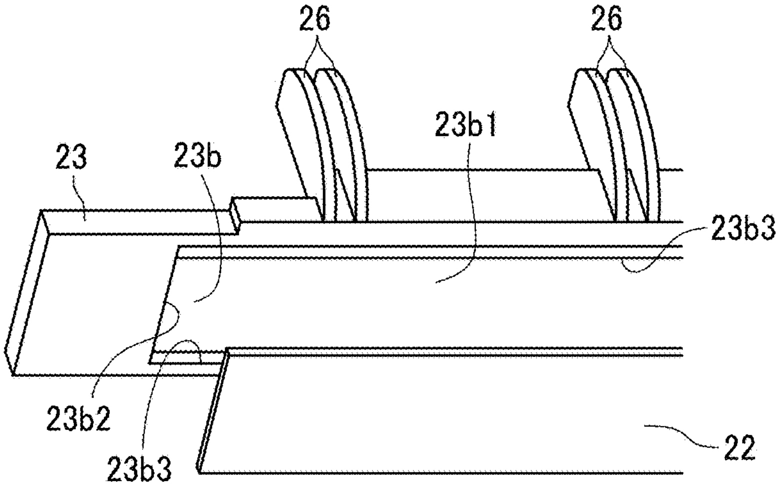
FIG. 31 is a partial perspective view of a heater and a heater holder.

As shown in FIG. 31, the heater holder 23 holds the heater 22 in the recess 23*b*. The recess 23*b* is provided on the heater 22 side of the heater holder 23 in thickness direction of the heater 22 (Z direction). The recess 23*b* includes, a surface 23*b*1 substantially parallel to the base 30 which is recessed to the stay 24 side than the other surfaces of the heater 22, a first wall portion 23*b*2 provided on the inner side of the heater holder 23 and at both sides (or one side) in the arrangement direction, and a second wall portion 23*b*3 provided on the inner side of the heater holder 23 and at both sides (or one side) in orthogonal direction to the arrangement direction. The heater holder 23 has a guide portion 26. The heater holder 23 is made of LCP (liquid crystal polymer).

Figure 32:
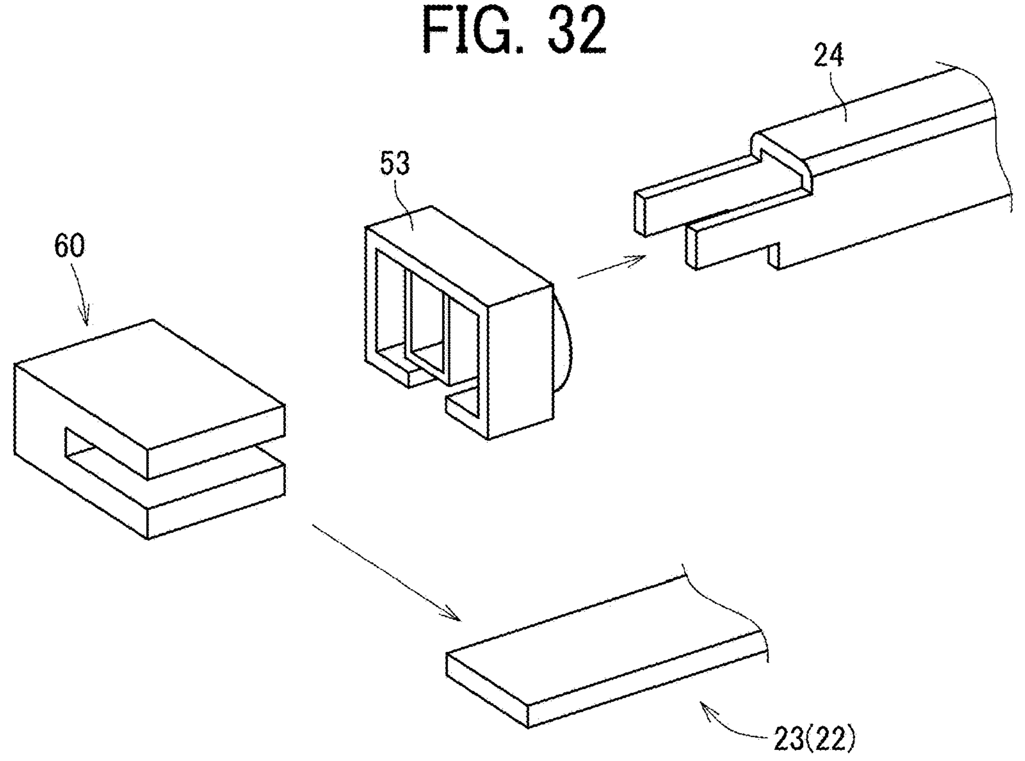
FIG. 32 is a partial perspective view to illustrate a method of attaching the connector to the heater.

As illustrated in FIG. 32, the connector 60 includes a housing made of resin (e.g., LCP), a plurality of contact terminals provided in the housing, and the like.

The connector 60 is mounted so as to sandwich the heater 22 and the heater holder 23 together from the front and back sides (see e.g. FIG. 8). In this state, each contact terminal makes contact (press-fitting) with each electrode of the heater 22, so that the heating region 35 and the power source provided in the image forming apparatus are electrically connected to each other through the connector 60. Thus, power can be supplied from the power source to the heating region 35. In order to ensure electrical connection with the connector 60, at least a part of each of the electrode 34 should be uncovered with the insulating layer and exposed from the insulating layer.

The flanges 53 are provided on both sides of the fixing belt 20 in the arrangement direction, and hold both ends of the fixing belt 20 from the inside of the fixing belt. The flange 53 is fixed to the housing (including the stay 24) of the fixing device 9. The each end of the stay 24 is inserted into each one of the flange 53 (see arrow direction from the flange 53 in FIG. 32).

Mounting direction of the connector 60 with respect to the heater 22 and the heater holder 23 is the arrangement intersecting direction of the heater (see arrow direction from the connector 60 in FIG. 32). A convex for positioning may be provided on one of the connector 60 and the heater holder 23, and a recess may be provided on the other. As such, while the connector 60 is attaching to the heater holder 23, the convex and the recess engage at an appropriate position, and enable the mount by the relative move along the predetermined direction along the recess. Further, the connector 60 is at one side, the side opposite to the side where the drive motor of the pressure roller 21 is provided, in the arrangement direction, and is attached to the heater 22 and the heater holder 23.

Figure 33:
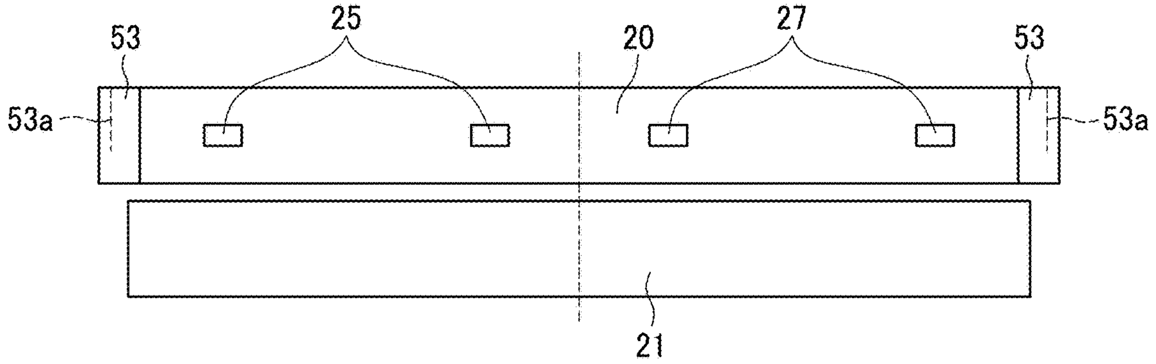
FIG. 33 is an example perspective schematic view of the heating device to show the arrangement of the thermistors and the thermostat.

As shown in FIG. 33, the thermistor 25 is provided at the central side (central side thermistor 25) and the end side (end side thermistor 25) in the arrangement direction of the fixing belt 20 (longitudinal direction of the heater) respectively. The thermistor 25 is facing the inner peripheral surface of the fixing belt 20. The heater 22 is controlled based on the temperature detected by the central side thermistor 25 and the end side thermistor 25. Incidentally, either one of these thermistors 25 is provided at a position corresponding to the interval between the resistance heating element of the heater 22.

A thermostat 27 is also provided at the central side (central side thermostat 27) and the end side (end side thermostat 27) in the arrangement direction of the fixing belt 20 respectively. The thermostat 27 facing the inner peripheral surface of the fixing belt 20. If the temperature of the fixing belt 20 detected by the thermostat 27 exceeds a predetermined threshold value, the thermostat 27 cutouts the electricity to the heater 22.

Flanges 53 are provided on the both ends, in the arrangement direction, of the fixing belt 20 to hold respective ends of the fixing belt 20. The flange 53 is formed of LCP (liquid crystal polymer).

Figure 34:
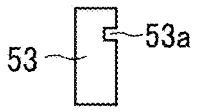
FIG. 34 is a cross-sectional view the flange to show a groove of the flange.

As shown in FIG. 34, the slide groove 53*a* is provided in the flange 53. The slide groove 53*a* extends in a contact and separation direction of the fixing belt 20 with respect to the pressing roller 21. The engaging portion of the housing (including a stay) of the fixing device 9 is engaged with the slide groove 53*a*. By the slide groove 53*a* is relatively moved along the engaging portion, the fixing belt 20 can be moved in the contact and separation directions with respect to the pressing roller 21.

Example of a Fixing Device Having a High Thermal Conductivity Member

Figure 35:
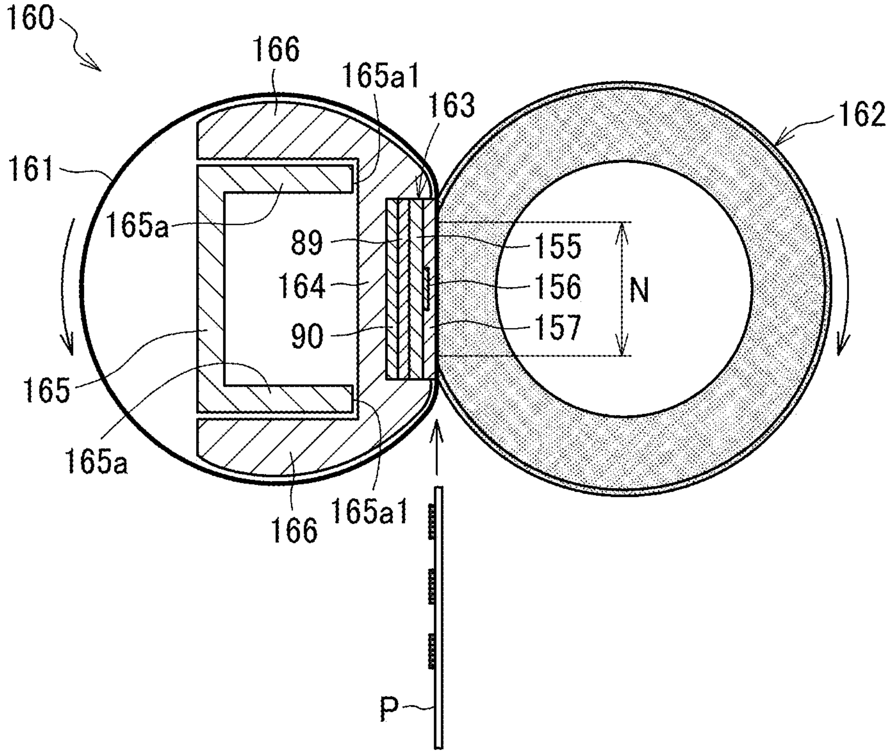
FIG. 35 is a schematic perspective view of another heating device.

The fixing device 160 illustrated in FIG. 35 includes a first high thermal conductivity member 89*a* and second high thermal conductivity member 90. The second high thermal conductivity member 90 between the heater holder 164 and the first high thermal conductivity member 89*a*. In the stacking direction (lateral direction in FIG. 35) of the first high-thermal conductivity member 89, the heater holder 164, and the stay 165, the second high thermal conductivity member 90 is provided at a position different from the first high-thermal conductivity member 89. More specifically, the second high thermal conductivity member 90 is provided superimposed on the first high thermal conductivity member 89.

Further, the fixing device 160 also includes the temperature sensor (thermistor) 167 as in the above drawings, but FIG. 35 shows a cross section where the temperature sensor 67 is not shown.

The second high thermal conductivity member 90 is made of a material having a higher thermal conductivity than the base 155, for example, graphene or graphite. The second high thermal conductivity member 90 is constituted by a graphite sheet having a thickness of 1 mm. Alternatively, the second high thermal conductivity member 90 may be constituted by a plate material such as aluminum, copper, or silver.

Figure 36:
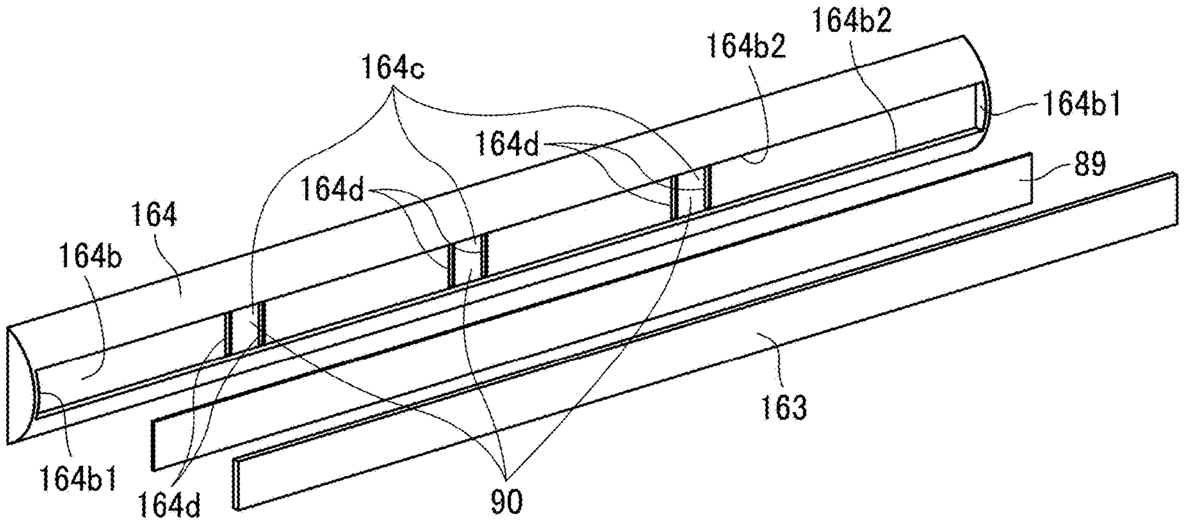
FIG. 36 a perspective view of a heater, a heater holder, a first heat conductor and a second heat conductor.

As shown in FIG. 36, a plurality of the second high thermal conductivity member 90 is disposed in the recess 164*b* of the heater holder 164. The plurality of the second high thermal conductivity member 90 is arranged with an interval therebetween in the longitudinal direction of the heater 163. The heater holder 164 includes a plurality of deeper recess 164*c*, that is depressed from the recess 164*b* of the heater holder 164, at portion including corresponding portion of the second high thermal conductivity member 90. Further, a gap 164*d* is provided between each end of the second high thermal conductivity member 90 and each opposing surface of the deeper recess 164*c* of the heater holder 164 in the longitudinal direction. Accordingly, the heat transferred from the second high thermal conductivity member 90 to the heater holder 164 is suppressed, and the fixing belt 161 is efficiently heated by the heater 163.

Figure 37:
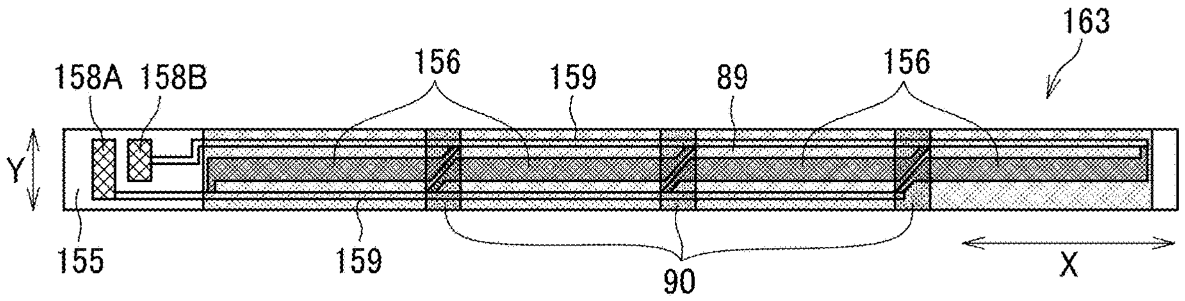
FIG. 37 is a plan view of the arrangement of the first heat conductor and the second heat conductor against the heater.

The heater 163 shown in FIG. 37 is an example of a heater in which a plurality of resistance having an interval therebetween and arranged in the longitudinal direction of the heater. As shown in FIG. 37, the second high thermal conductivity member 90 (see hatching part) is disposed on a position corresponding to the interval B, where the resistance heating element 156 partially overlaps to the adjacent resistance heating element 156 in the longitudinal direction (arrow X direction). In particular, the second high thermal conductivity member 90 is disposed so as to cover the entire interval B. In FIG. 37 (and FIG. 39 to be described later), the first high thermal conductive member 89 is disposed so as to cover entirely of the longitudinal direction of all the resistance heating element 156, but it is not limited thereto.

Figure 38:
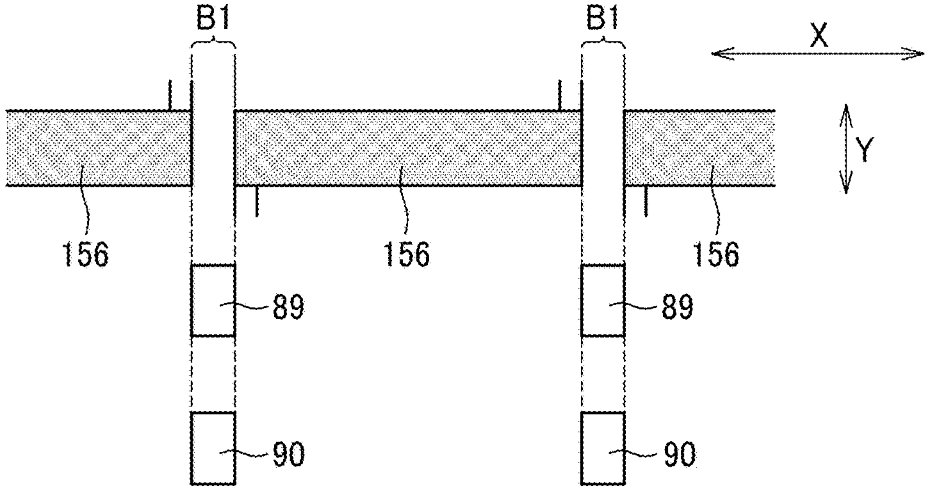
FIG. 38 is a plan view of another arrangement of the first heat conductor and the second heat conductor against the heater.

In addition to the first high thermal conductivity member 89, the second high heat conductivity member 90 is disposed on the position corresponding to the interval B, at where at least a portion of the resistance heating element 156 partially overlaps to the adjacent resistance heating element 156 so that heat would be well transferred in the longitudinal direction over the interval B, and which enables more effective suppression of the longitudinal temperature unevenness of the heater 163. Further, as shown in FIG. 38, providing the first high thermal conductivity member 89 and the second high thermal conductivity member 90 only over its entire area at a position corresponding to the interval B1. Thus, at a position corresponding to the interval B1, it is possible to particularly improve the heat transfer efficiency as compared with other regions. In FIG. 38, the resistance heating element 156, the first high thermal conductivity member 89 and the second high thermal conductivity member 90 are shown shifted respectively in the vertical direction of the figure (arrow Y direction, which is the longitudinal intersecting direction) for convenience, but actually, they are arranged at substantially the same position in the Y direction. However, it is not limited thereto, but also, for example, the first high thermal conductivity member 89 and the second high thermal conductivity member 90 may be disposed in a portion of the longitudinal intersecting direction of the resistance heating element 156 or may be disposed so as to cover the entire resistance heating element 156 in longitudinal intersecting direction.

Further, both the first high thermal conductivity member 89 and the second high thermal conductivity member 90 may be constituted by the graphene sheet. In this case, it is possible to form the first high thermal conductivity member 89 and the second high thermal conductivity member 90 having a high thermal conductivity in a predetermined direction along the surface of the graphene, that is, in the longitudinal direction rather than the thickness direction. Therefore, the longitudinal temperature unevenness of the heater 163 and the fixing belt 161 can be effectively suppressed.

Figure 41:
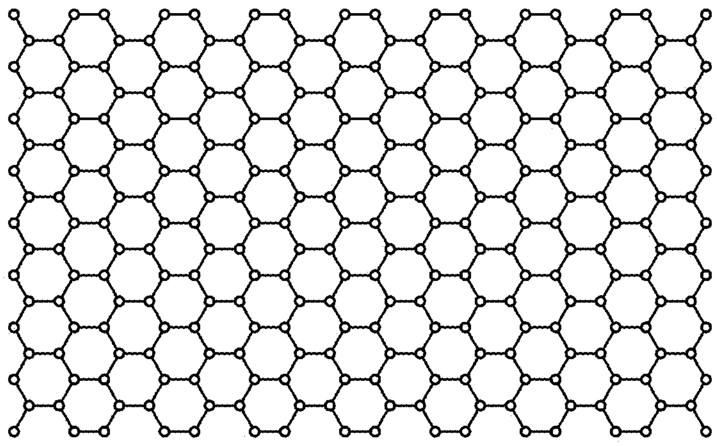
FIG. 41 is a schematic diagram illustrating a two-dimensional atomic crystal structure of graphene.

Graphene is originally a flaky powder. Graphene includes a planar hexagonal lattice of carbon atoms, as shown in FIG. 41. The graphene sheet is a sheet-like graphene, and is usually made to be a single layer. In addition, the graphene sheet may contain impurities in a single layer of carbon or may have a fullerene structure. The fullerene structures are generally recognized as compounds in which the same number of carbon atoms form a 5- and 6-membered cage-like fused polycyclic ring, for example, C60, C70, and C80 fullerenes or other closed cage structures having three-coordinate carbon atoms.

The graphene sheet is an artifact and can be produced, for example, by a chemical vapor deposition (CVD) method.

A commercially available product of graphene sheet can be used as well. The size, the thickness, the number of layers of the graphite sheet to be described later, and the like could be measured by, for example, a transmission electron microscope (TEM).

Figure 42:
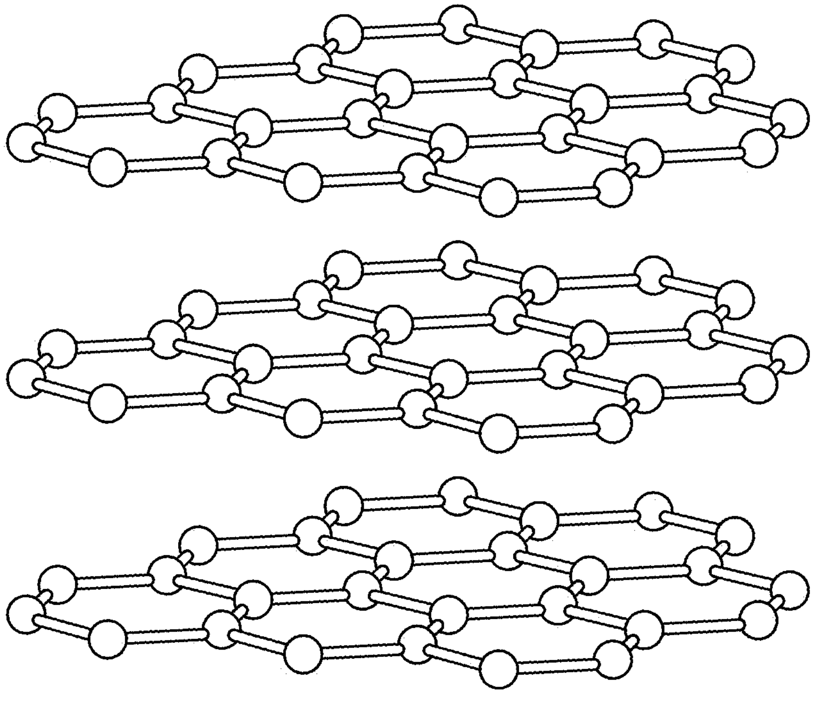
FIG. 42 is a schematic diagram illustrating a three-dimensional atomic crystal structure of graphite.

Graphite with multilayered graphene also has a large heat conduction anisotropy. Graphite, as shown in FIG. 42, includes a crystal structure includes multiple overlapped layer of the planar spread layers and each layer is the fused six-membered ring layer of carbon atoms. The carbon atoms in the crystal structure form covalent bonds between adjacent carbon atoms in the layer, and the carbon atoms in the layer form van der Waals bonds between each layer. The covalent bond has a larger bonding force than the van der Waals bond, and has a large anisotropy in bonding in the layer and bonding between layers. That is, by configuring the first high thermal conductivity member 89 or the second high thermal conductivity member 90 by graphite, the longitudinal heat transfer efficiency in the first high thermal conductivity member 89 or the second high thermal conductivity member 90 is increased compared to the thickness direction (i.e., the stacking direction of the member), so that the heat transfer to the heater holder 164 may be suppressed. Therefore, it is possible to efficiently suppress the longitudinal temperature unevenness of the heater 163, and to minimize the heat flowing out to the heater holder 164. Also, by consisting the first high thermal conductivity member 89 or the second high thermal conductivity member 90 by graphite, it is possible to have excellent heat resistance, which does not oxidized to about 700 degrees, to the first high thermal conductivity member 89 or the second high thermal conductivity member 90.

Physical properties and dimensions of the graphite sheet can be appropriately changed in accordance with the function required for the first high thermal conductivity member 89 or the second high thermal conductivity member 90. For example, using a high-purity graphite or single crystal graphite, or by increasing the thickness of the graphite sheet, it is possible to increase the anisotropy of the thermal conduction. For other example, in order to increase the speed of the fixing device, the heat capacity of the fixing device may be reduced by using a graphite sheet having a small thickness. Further, when the width of the nip portion N and the heater 163 is large, the width of the first high thermal conductivity member 89 or the second high thermal conductivity member 90 may be increased accordingly.

From the viewpoint of enhancing the mechanical strength, the number of layers of the graphite sheet is 11 or more. The graphite sheet may also partially comprise a single layer and a multi-layer portion.

Figure 39:
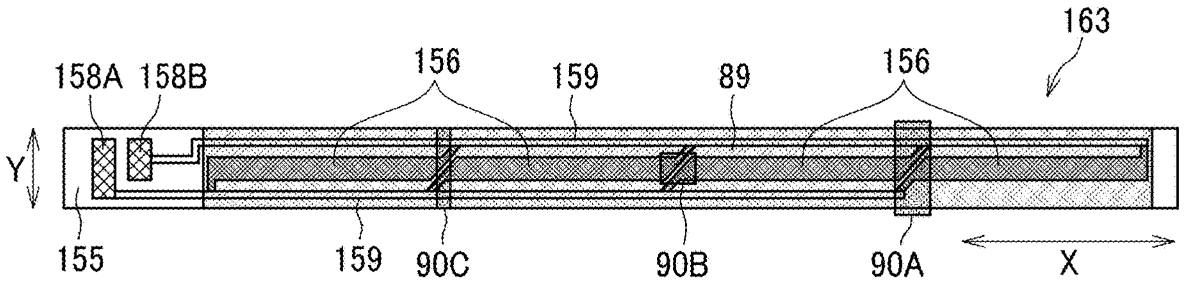
FIG. 39 is a plan view of another arrangement of the second heat conductor against the heater.

The second high thermal conductivity member 90 is not limited to the arrangement of FIG. 37, but may be provided at a position where at a position corresponding to the interval B1 (or interval B1 and its peripheral region) and where at least a portion of the adjacent resistance heating elements 156 is overlapping in the longitudinal direction. For example, as shown in FIG. 39, the second high-thermal conductivity member 90A, in the longitudinal intersecting direction (lateral direction, the arrow Y direction), may be provided to protrude to both sides in the longitudinal intersecting direction than the substrate 155. The second high thermal conductivity member 90B, in the longitudinal intersecting direction, it may be provided in the extent that the resistive heating element 156 is provided. The second high thermal conductivity member 90C may be provided in a part of the interval B1.

Figure 40:
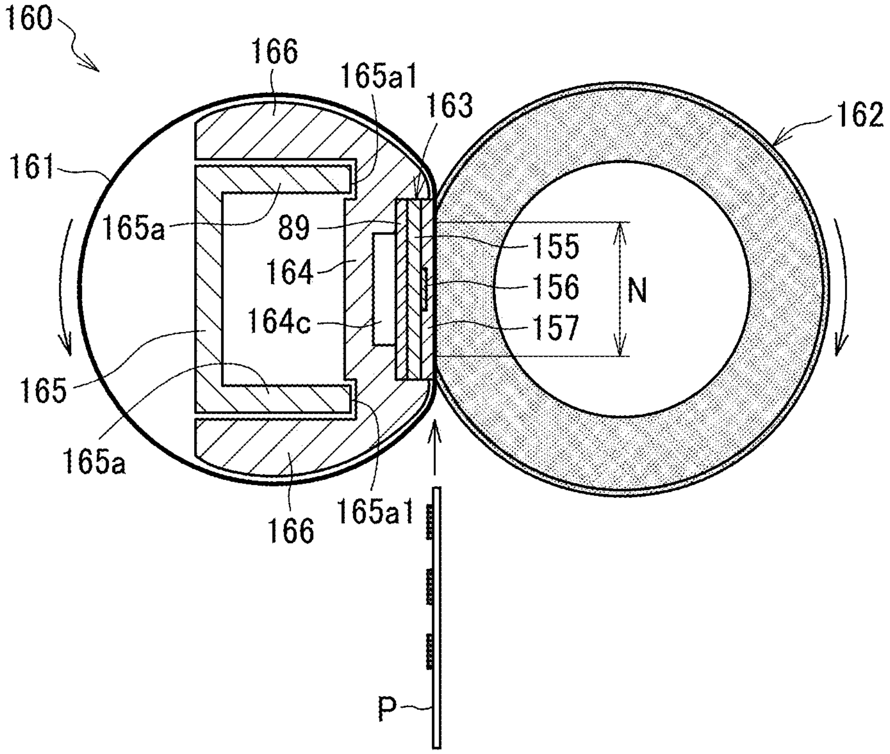
FIG. 40 is a schematic perspective view of another heating device.

Further, as shown in FIG. 40, a gap in the thickness direction (lateral direction in FIG. 40) is provided between the first high thermal conductivity member 89 and the heater holder 164. That is, in at least a portion of the recess 164*b* of the heater holder 164 where the heater 163, the first high thermal conductivity member 89, and the second high thermal conductivity member 90 is disposed (see FIG. 36), the relief portion 164*c* as a heat insulating layer is provided. Further, the relief portion 164*c* is provided in a portion of the longitudinal direction excluding the portion where the second high thermal conductivity member 90 (not shown in FIG. 40) is provided. Further, the relief portion 164*c* is formed by increasing a part of the depth of the recess 164*b* of the heater holder 164 than the other portions. Thus, since the contact area between the heater holder 164 and the first high thermal conductivity member 89 can be minimized, heat transfer from the first high thermal conductivity member 89 to the heater holder 164 is suppressed, so that the fixing belt 161 can be efficiently heated by the heater 163. Incidentally, in the cross section where the second high thermal conductivity member 90 in the longitudinal direction is provided, as shown in FIG. 35, the second high thermal conductivity member 90 abuts the heater holder 164.

Further, the relief portion 164*c*, in the longitudinal intersecting direction (vertical direction in FIG. 40), is provided over the entire range in which the resistance heating element 156 is provided. Thus, heat transfer from the first high heat conductive member 89 to the heater holder 164 is effectively suppressed, and the heating efficiency of the fixing belt 161 by the heater 163 is improved. In addition, instead of providing a space as the relief portion 164*c*, the heat insulating layer could be constructed by providing a heat insulating member having a lower thermal conductivity than the heater holder 164.

Further, the second high thermal conductivity member 90 is provided as a member different from the first high thermal conductivity member 89, but is not limited thereto. For example, by increasing the thickness of a portion corresponding to the distance B1 of the first high thermal conductivity member 89 than the other portions, the first high thermal conductivity member 89 may also serve the function of the second high thermal conductivity member 90.

As described above, an exemplary implementation of the present disclosure includes a heating device (9) comprising: an endless belt (20); a heater (22) including a base (30) and a heat generator (31); a flange (53), including a beam (53*h*) and disposed at an end of the endless belt (20), configured to support the endless belt (20) rotatably; a temperature detector (25 and/or 27) to detect a temperature and disposed inside the endless belt (20); a lead wire (250 and/or 270) connected to the temperature detector (25 and/or 27) and extends from inside of the endless belt (20) to outside of the endless belt (20) through an inside of the flange (53), the inside of the flange (53) is a side environed by the beam (53*h*) and the other surface of the flange (53); a heater holder (23) to hold the heater (22); a stay (24) to support the heater holder (23); the stay (24) extend to at least the inside of the flange (53) and to outside of the endless belt (20); a gap (Qa, Qb) formed between the flange (53) and one of the heater (22), the heater holder (23), and the stay (24), when all of the heater (22), the heater holder (23), and the stay (24) were pressed toward one side of the flange (53); wherein the gap (Qa, Qb) is smaller than a diameter of the lead wire (250 and/or 270).

In the heating device 9, while the heating device is in the non-pressuring state, a backlash (Ua) would be formed between the flange and one of the heater, the heater holder, and the stay in pressuring direction (direction Z) and, the backlash (Ua) is at least smaller than a largest diameter of the plurality of the lead wire. And, while the heating device is in the non-pressuring state, a backlash (Ub) could be formed between the flange and one of the heater, the heater holder, and the stay in a direction perpendicular to the pressuring direction (direction Y) and, the backlash (Ub) is at least smaller than a largest diameter of the plurality of the lead wire. Further, it would be preferable if a square root of (Ua×Ua+Ub×Ub) is smaller than a largest diameter of the plurality of the lead wire. The amount of backlash (Ua or Ub) corresponds to the gap (Qa, Qb or Qd, Qe).

Thus, it is possible to prevent disconnection caused by the lead wire being sandwiched between the stay and the flange. Further, it is possible to prevent the lead wire being twisted between the stay and the flange (assembling error).

In the present disclosure as described above, there are the lead wires 250,270 (a plurality of lead wires), and the gap Qa, Qb, Qc, Qd, Qf, Qh is smaller than the size of the smallest outer diameter of the lead wires 250,270.

Thus, it is possible to prevent the disconnection generated by the lead wire being sandwiched between the stay and the flange for all the lead wires. Further, it is possible, for all the lead wires, to prevent the lead wire being twisted between the stay and the flange (assembling error).

As described above, the heating device (9) further comprising: another flange (53), including a beam (53*h*) and disposed at another end of the endless belt (20), configured to support the endless belt (20) rotatably; a plurality of temperature detector (25 and/or 27) including the temperature detector (25 and/or 27) as a first temperature detector (27) and a second temperature detector (25); a plurality of lead wire (250 and/or 270) including as a first lead wire (270) as the lead wire (270) and a second lead wire (250); the second lead wire (250) connected to the second temperature detector (25) and extends from inside of the endless belt (20) to outside of the endless belt (20) through the inside of the another flange (53); a diameter of the second lead wire (250) is smaller than the diameter of the first lead wire (270); the stay (24) extend to at least the inside of the another flange (53) and to outside of the endless belt (20); another gap (Qa, Qb) formed between the another flange (53) and one of the heater (22), the heater holder (23), and the stay (24), when all of the heater (22), the heater holder (23), and the stay (24)

were pressed toward one side of the another flange (53); wherein the gap (Qa, Qb) is larger than the another gap (Qa, Qb).

Thus, the optimal size of the gap could be secured with the configuration of the lead wire and it enables smooth mounting of the flange.

As described above, the heating device (9) further including, a plurality of temperature detector (25 and/or 27) including the temperature detector (25 and/or 27) as a first temperature detector (27) and a second temperature detector (25); a plurality of lead wire (250 and/or 270) including as a first lead wire (270) as the lead wire (270) and a second lead wire (250); the second lead wire (250) connected to the second temperature detector (25) and extends from inside of the endless belt (20) to outside of the endless belt (20) through the inside of the flange (53); a diameter of the second lead wire (250) is smaller than the diameter of the first lead wire (270); wherein the gap (Qa, Qb) is smaller than a diameter of the first lead wire (270).

Thus, the optimal size of the gap can be secured with the configuration of the lead wire, it enables smooth mounting of the flange.

As described above, the first temperature detection member 27 is a thermostat.

Thus, when the heater is excessively heated due to the occurrence of some abnormality, the power to the heater is cut off, thereby it is possible to ensure the safety of the fixing device.

As described above, the second temperature detection member 25 is a thermistor.

This ensures to detect the temperature of the heater, so that the temperature of the heater would be controlled to an appropriate temperature.

As described above, the gaps Qa, Qb, and Qc are formed between the heating member 22 and the bridging portion (beam) 53*h* when the heating member 22 is brought into contact with the bridging portion 53*h*.

Thus, it is possible to prevent the disconnection generated by the lead wire being sandwiched between the stay and the flange.

As described above, the gaps Qd, Qf, and Qh are formed between the reinforcing member 24 and the end holding member 53 when the reinforcing member 24 is brought into contact with the end holding member 53.

Thus, the lead wire between the stay and the flange can be prevented from being twisted (assembly error).

As described above, there are the lead wires 250,270 (a plurality of lead wires) and the gap Qa, Qb, Qc is smaller than the size of the smallest outer diameter of the lead wires 250,270.

Thus, it is possible to prevent the disconnection generated by the lead wire being sandwiched between the stay and the flange.

As described above, there are the lead wires 250,270 (a plurality of lead wires) and the gap Qa, Qb, Qc is larger than the size of the smallest outer diameter of the lead wires 250,270.

This improves the assemble-ability (decrease difficulty of assembling) of the device while preventing disconnection caused by twisting of the lead wire of the largest outer diameter size.

As described above, there are the lead wires 250,270 (a plurality of lead wires) and the gap Qd, Qf, Qh is smaller than the size of the smallest outer diameter of the lead wires 250,270.

Thus, the lead wire between the stay and the flange can be prevented from being twisted (assemble error).

As described above, there are the lead wires 250,270 (a plurality of lead wires) and the gap Qd, Qf, Qh is larger than the size of the smallest outer diameter of the lead wires 250,270.

This improves the assemble-ability (decrease difficulty of assembling) of the device while preventing disconnection caused by twisting of the lead wire of the largest outer diameter size.

As described above, the width of the bridging portion (beam) 53*h* is larger than the size of the outer diameter of the lead wires 250 and 270, and when there is a plurality of lead wires 250 and 270, it is larger than outer diameter of the largest one of the plurality of lead wires 250 and 270.

Thus, the deformation of the flange can be suppressed.

As described above, the thickness of the bridging portion (beam) 53*h* is larger than the size of the outer diameter of the lead wires 250 and 270, in the case where there is a plurality of lead wires 250 and 270, it is larger than outer diameter of the largest one of the plurality of lead wires 250 and 270.

Thus, the deformation of the flange can be suppressed.

As described above, the end holding member 53 is formed of resin.

As a result, molding shrinkage, creep deformation, and the like could be prevented.

As described above, the bridge portion (beam) 53*h* has the rib 53*r*, and the rib 53*r* is larger than the outer diameter of the lead wire 250,270.

Thus, the strength of the bridge portion (beam) 53*h* could be improved.

As described above, the heating device including a side plate (80) movably holds the flange (53); wherein the beam (53*h*) overlaps the side plate (80) in a direction perpendicular to rotational direction of the endless belt (20).

Thus, it is possible to suppress the deformation according to the fitting portion of the side plate, it increases the positional accuracy.

Other Applications

For other applications, for example, the heating device according to the disclosure may be applied as a drying device of an inkjet image forming apparatus.

For other applications, for example, the fixing device according to the present disclosure may be applied to a laminate processing apparatus.

While present disclosure has been described above, it is not limited to the above-described embodiments, but various modifications may be made without departing from the scope of the present disclosure.

In the present disclosure, the term "heating device" sometimes used as to a construction including a pressure roller and a mechanism for pressing.

And what was described above is an example, and the present disclosure produces the particular effect for each following aspect.

Aspect 1. A heating device (9), comprising:

an endless belt (20);

a heater (22) including a base (30) and a heat generator (31);

a flange (53), including a beam (53*h*), wherein the flange is disposed at an end of the endless belt (20), and the flange rotatably supports the endless belt (20);

temperature detector (25 and/or 27) to detect a temperature, the temperature detector disposed inside the endless belt (20);

a lead wire (250 and/or 270) connected to the temperature detector (25 and/or 27), the lead wire extending from an inside of the endless belt (20) to an outside of the endless belt (20) through an inside of the flange (53), wherein the inside of the flange (53) is a side surrounded by the beam (53*h*) and the other surface of the flange (53);

a heater holder (23) to hold the heater (22); and a stay (24) to support the heater holder (23), the stay (24) extending to at least the inside of the flange (53) and to the outside of the endless belt (20, wherein a gap separates the flange (53) from one of the heater (22), the heater holder (23), and the stay (24), when all of the heater (22), the heater holder (23), and the stay (24) were pressed toward one side of the flange (53), and the gap (Qa, Qb) is smaller than a diameter of the lead wire (250 and/or 270).

Aspect 2. The heating device according to Aspect 1, further comprising a plurality of lead wires (250 and/or 270) including the lead wire (250 and/or 270), wherein the gap (Qa, Qb) is smaller than a diameter of the smallest lead wire of the plurality of the lead wires (250 and/or 270).

Aspect 3. The heating device according to Aspect 1 or 2, further comprising:

another flange (53) including another beam, wherein the another flange is (53*h*) disposed at another end of the endless belt (20), and the another flange rotatably supports the endless belt (20);

a plurality of temperature detectors (25 and/or 27) including a first temperature detector (27) and a second temperature detector (25), wherein the temperature detector is the first temperature detector; and a plurality of lead wires (250 and/or 270) including a first lead wire (270) and a second lead wire (250), wherein the lead wire is the first lead wire, wherein the second lead wire (250) is connected to the second temperature detector (25), the second lead wire extends from the inside of the endless belt (20) to the outside of the endless belt (20) through the inside of the another flange (53), a diameter of the second lead wire (250) is smaller than the diameter of the first lead wire (270), the stay (24) extends to at least the inside of the another flange (53) and to outside of the endless belt (20), another gap (Qa, Qb) separates the another flange (53) and one of the heater (22), the heater holder (23), and the stay (24), when all of the heater (22), the heater holder (23), and the stay (24) were pressed toward one side of the another flange (53), and the gap (Qa, Qb) is larger than the another gap (Qa, Qb).

Aspect 4. The heating device according to Aspect 1, further comprising:

a plurality of temperature detectors (25 and/or 27) including a first temperature detector (27) and a second temperature detector (25); and a plurality of lead wires (250 and/or 270) including a first lead wire (270) as the lead wire (270) and a second lead wire (250), wherein the temperature detector is the first temperature detector, the lead wire is the first lead wire, the second lead wire (250) is connected to the second temperature detector (25) and extends from the inside of the endless belt (20) to the outside of the endless belt (20) through the inside of the flange (53), a diameter of the second lead wire (250) is smaller than the diameter of the first lead wire (270), and the gap (Qa, Qb) is smaller than a diameter of the first lead wire (270).

Aspect 5. The heating device according to Aspect 3, wherein the first temperature detector (27) is a thermostat (27).

Aspect 6. The heating device according to Aspect 4, wherein the first temperature detector (27) is a thermostat (27).

Aspect 7. The heating device according to Aspect 3, wherein the second temperature detector (25) is a thermistor (25).

Aspect 8. The heating device according to Aspect 4, wherein the second temperature detector (25) is a thermistor (25).

Aspect 9. The heating device according to Aspect 1 to 8, wherein a direction toward the one side of the flange (53) is toward the beam (53*h*), and the gap is (Qa, Qb) between the stay (24) and the other surface of the flange (53).

Aspect 10. The heating device according to Aspect 1 to 8, wherein a direction toward the one side of the flange (53) is a direction away from the beam (53*h*), and the gap is (Qa, Qb) between the heater (22) and the beam (53*h*).

Aspect 11. The heating device according to Aspect 1 to 10, further comprising a plurality of lead wires (250 and/or 270), wherein a width of the beam (53*h*) in a rotational direction of the endless belt (20) is larger than a diameter of a largest lead wire (250 or 270) of the plurality of lead wires.

Aspect 12. The heating device according to Aspect 1 to 10, further comprising a plurality of lead wires (250 and/or 270), wherein a width of the beam (53*h*) in a direction perpendicular to a rotational direction of the endless belt (20) is larger than a diameter of a largest lead wire (250 or 270) of the plurality of lead wires.

Aspect 13. The heating device according to Aspect 1 to 12, wherein the flange (53) is made of resin.

Aspect 14. The heating device according to Aspect 1 to 13, wherein the beam (53*h*) includes a rib (53*p*) that is thicker than the diameter of the lead wire (250 or 270).

Aspect 15. A fixing device, comprising:

the heating device according to one of Aspect 1 to 14; and a side plate (80) movably holds the flange (53), wherein the beam (53*h*) overlaps the side plate (80) in a direction perpendicular to a rotational direction of the endless belt (20).

Aspect 16. An image forming apparatus comprising, the fixing device according to Aspect 15.

Aspect 17. An drier comprising, the heating device according to one of Aspect 1 to 14.

Aspect 18. An ink jet image forming apparatus comprising, the drier according to Aspect 17.

Aspect 19. A laminate processing apparatus comprising, the heating device according to one of Aspect 1 to 14.

Aspect 20. A heating device (9) comprising:

an endless belt (20);

a heater (22) including a base (30) and a heat generator (31);

a pressure roller (21) to press the endless belt (20) toward the heater (22) while the heating device is in a pressuring state;

a flange (53), including a beam (53*h*), wherein the flange is disposed at an end of the endless belt (20), and the flange rotatably supports the endless belt (20);

a temperature detector (25 and/or 27) to detect a temperature, the temperature detector disposed inside the endless belt (20);

a lead wire (250 and/or 270) connected to the temperature detector (25 and/or 27), the lead wire extending from an inside of the endless belt (20) to an outside of the endless belt (20) through an inside of the flange (53), wherein the inside of the flange (53) is a side surrounded by the beam (53*h*) and the other surface of the flange (53);

a heater holder (23) to hold the heater (22);

a stay (24) to support the heater holder (23), the stay (24) extending to at least the inside of the flange (53) and to outside of the endless belt (20); and a backlash (Ua, Ub) which is between the flange (53) and one of the heater (22), the heater holder (23), and the stay (24), while the heating device is in a non-pressuring state, wherein the backlash (Ua, Ub) is smaller than a diameter of the lead wire (250 and/or 270).

What is claimed is:

1. A heating device, comprising:

an endless belt;

a heater including a base and a heat generator;

a flange including a beam, wherein the flange is disposed at an end of the endless belt, and the flange rotatably supports the endless belt;

a temperature detector to detect a temperature, the temperature detector disposed inside the endless belt;

a lead wire connected to the temperature detector, wherein the lead wire extends from an inside of the endless belt to an outside of the endless belt through an inside of the flange, and the inside of the flange is surrounded by the beam and an other surface of the flange;

a heater holder to hold the heater; and a stay to support the heater holder, wherein the stay extends to the inside of the flange and to the outside of the endless belt, wherein a gap separates the flange from one of the heater, the heater holder, and the stay, when all of the heater, the heater holder, and the stay are pressed toward one side of the flange, and the gap is smaller than a diameter of the lead wire.

2. The heating device according to claim 1, further comprising a plurality of lead wires including the lead wire, wherein the gap is smaller than a diameter of the smallest lead wire of the plurality of the lead wires.

3. The heating device according to claim 1, further comprising:

another flange including another beam, wherein the another flange is disposed at another end of the endless belt, and the another flange rotatably supports the endless belt;

a plurality of temperature detectors including a first temperature detector and a second temperature detector, wherein the temperature detector is the first temperature detector; and a plurality of lead wires including a first lead wire and a second lead wire, wherein the lead wire is the first lead wire, wherein the second lead wire is connected to the second temperature detector, the second lead wire extends from the inside of the endless belt to the outside of the endless belt through the inside of the another flange, a diameter of the second lead wire is smaller than the diameter of the first lead wire, the stay extends to at least the inside of the another flange and to outside of the endless belt, another gap separates the another flange and one of the heater, the heater holder, and the stay, when all of the heater, the heater holder, and the stay were pressed toward one side of the another flange, and the gap is larger than the another gap.

4. The heating device according to claim 3, wherein the first temperature detector is a thermostat.

5. The heating device according to claim 3, wherein the second temperature detector is a thermistor.

6. The heating device according to claim 1, further comprising:

a plurality of temperature detectors including a first temperature detector and a second temperature detector; and a plurality of lead wires including a first lead wire as the lead wire and a second lead wire, wherein the temperature detector is the first temperature detector, the lead wire is the first lead wire, the second lead wire is connected to the second temperature detector and extends from the inside of the endless belt to the outside of the endless belt through the inside of the flange, a diameter of the second lead wire is smaller than the diameter of the first lead wire, and the gap is smaller than a diameter of the first lead wire.

7. The heating device according to claim 6, wherein the first temperature detector is a thermostat.

8. The heating device according to claim 6, wherein the second temperature detector is a thermistor.

9. The heating device according to claim 1, wherein a direction toward the one side of the flange is toward the beam, and the gap is between the stay and the other surface of the flange.

10. The heating device according to claim 1, wherein a direction toward the one side of the flange is a direction away from the beam, and the gap is between the heater and the beam.

11. The heating device according to claim 1, further comprising a plurality of lead wires, wherein a width of the beam in a rotational direction of the endless belt is larger than a diameter of a largest lead wire of the plurality of lead wires.

12. The heating device according to claim 1, further comprising a plurality of lead wires, wherein a width of the beam in a direction perpendicular to a rotational direction of the endless belt is larger than a diameter of a largest lead wire of the plurality of lead wires.

13. The heating device according to claim 1, wherein the flange is made of resin.

14. The heating device according to claim 1, wherein the beam includes a rib that is thicker than the diameter of the lead wire.

15. A fixing device, comprising:

the heating device according to claim 1; and a side plate movably holds the flange, wherein the beam overlaps the side plate in a direction perpendicular to a rotational direction of the endless belt.

16. An image forming apparatus comprising, the fixing device according to claim 15.

17. An drier comprising, the heating device according to claim 1.

18. An ink jet image forming apparatus comprising, the drier according to claim 17.

19. A laminate processing apparatus comprising, the heating device according to claim 1.

20. A heating device, comprising:

an endless belt;

a heater including a base and a heat generator;

a pressure roller to press the endless belt toward the heater while the heating device is in a pressuring state;

a flange, including a beam, wherein the flange is disposed at an end of the endless belt, and the flange rotatably supports the endless belt;

a temperature detector to detect a temperature, the temperature detector disposed inside the endless belt;

a lead wire connected to the temperature detector, the lead wire extending from an inside of the endless belt to an outside of the endless belt through an inside of the flange, wherein the inside of the flange is a side surrounded by the beam and the other surface of the flange;

a heater holder to hold the heater;

a stay to support the heater holder, the stay extending to at least the inside of the flange and to outside of the endless belt; and a backlash which is between the flange and one of the heater, the heater holder, and the stay, while the heating device is in a non-pressuring state, wherein the backlash is smaller than a diameter of the lead wire.

* * * * *